(12) United States Patent
Maruyama et al.

(10) Patent No.: US 10,136,403 B2
(45) Date of Patent: Nov. 20, 2018

(54) COMMUNICATION CONTROL DEVICE WITH DYNAMIC FRAGMENTING OF NON-REAL-TIME DATA

(71) Applicant: Hitachi, Ltd., Chiyoda-ku, Tokyo (JP)

(72) Inventors: Tatsuya Maruyama, Tokyo (JP); Tsutomu Yamada, Tokyo (JP); Mitsuyasu Kido, Tokyo (JP); Shouji Yoshida, Tokyo (JP); Kazuhisa Takami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 167 days.

(21) Appl. No.: 15/172,315

(22) Filed: Jun. 3, 2016

(65) Prior Publication Data
US 2016/0360497 A1 Dec. 8, 2016

(30) Foreign Application Priority Data
Jun. 3, 2015 (JP) ................................. 2015-112763

(51) Int. Cl.
*H04L 12/805* (2013.01)
*H04W 56/00* (2009.01)
(Continued)

(52) U.S. Cl.
CPC .......... *H04W 56/001* (2013.01); *H04L 47/36* (2013.01); *H04L 51/04* (2013.01); *H04L 65/608* (2013.01);
(Continued)

(58) Field of Classification Search
CPC .. H04N 21/6437; H04N 21/43; H04N 21/434; H04N 21/45457; H04L 65/608;
(Continued)

(56) References Cited

U.S. PATENT DOCUMENTS

| 2003/0059005 A1* | 3/2003 | Meyerson | ............... H04L 51/36 379/88.17 |
| 2003/0067903 A1* | 4/2003 | Jorgensen | ................. H04L 1/20 370/338 |

(Continued)

FOREIGN PATENT DOCUMENTS

| JP | 2004-208119 A | 7/2004 |
| JP | 2004208119 A | * 7/2004 |

OTHER PUBLICATIONS

English translation for JP 2004-208119 A (Year: 2018).*

*Primary Examiner* — Salvador E Rivas
(74) *Attorney, Agent, or Firm* — Crowell & Moring LLP

(57) ABSTRACT

There is provided a communication control device including: a real-time communication status extraction unit that acquires a communication timing of real-time data; a dynamic fragment size determination unit that acquires a fragment size of sending data which can be sent until the communication timing acquired by the real-time communication status extraction unit; a fragment processing unit that fragments non-real-time data to have at least a fragment size which is equal to or less than the fragment size acquired by the dynamic fragment size determination unit; and a communication unit that sends the non-real-time data, which is fragmented by the fragment processing unit, before the communication timing of the real-time data.

14 Claims, 20 Drawing Sheets

(51) Int. Cl.
*H04N 21/6437* (2011.01)
*H04L 29/06* (2006.01)
*H04L 12/58* (2006.01)
*H04N 21/4545* (2011.01)
*H04L 12/863* (2013.01)
*H04L 12/935* (2013.01)

(52) U.S. Cl.
CPC ....... *H04N 21/6437* (2013.01); *H04L 47/628* (2013.01); *H04L 49/3072* (2013.01); *H04N 21/45457* (2013.01)

(58) Field of Classification Search
CPC ... H04L 47/36; H04L 47/628; H04L 49/3072; H04L 51/04
See application file for complete search history.

(56) References Cited

U.S. PATENT DOCUMENTS

| | | | |
|---|---|---|---|
| 2006/0177020 A1* | 8/2006 | Huart | H04M 3/428 379/88.13 |
| 2009/0080412 A1* | 3/2009 | Yoneyama | H04L 65/602 370/352 |
| 2014/0025985 A1* | 1/2014 | Tochio | G06F 11/2002 714/4.2 |
| 2015/0256583 A1* | 9/2015 | Rosenzweig | H04L 65/602 709/219 |

* cited by examiner

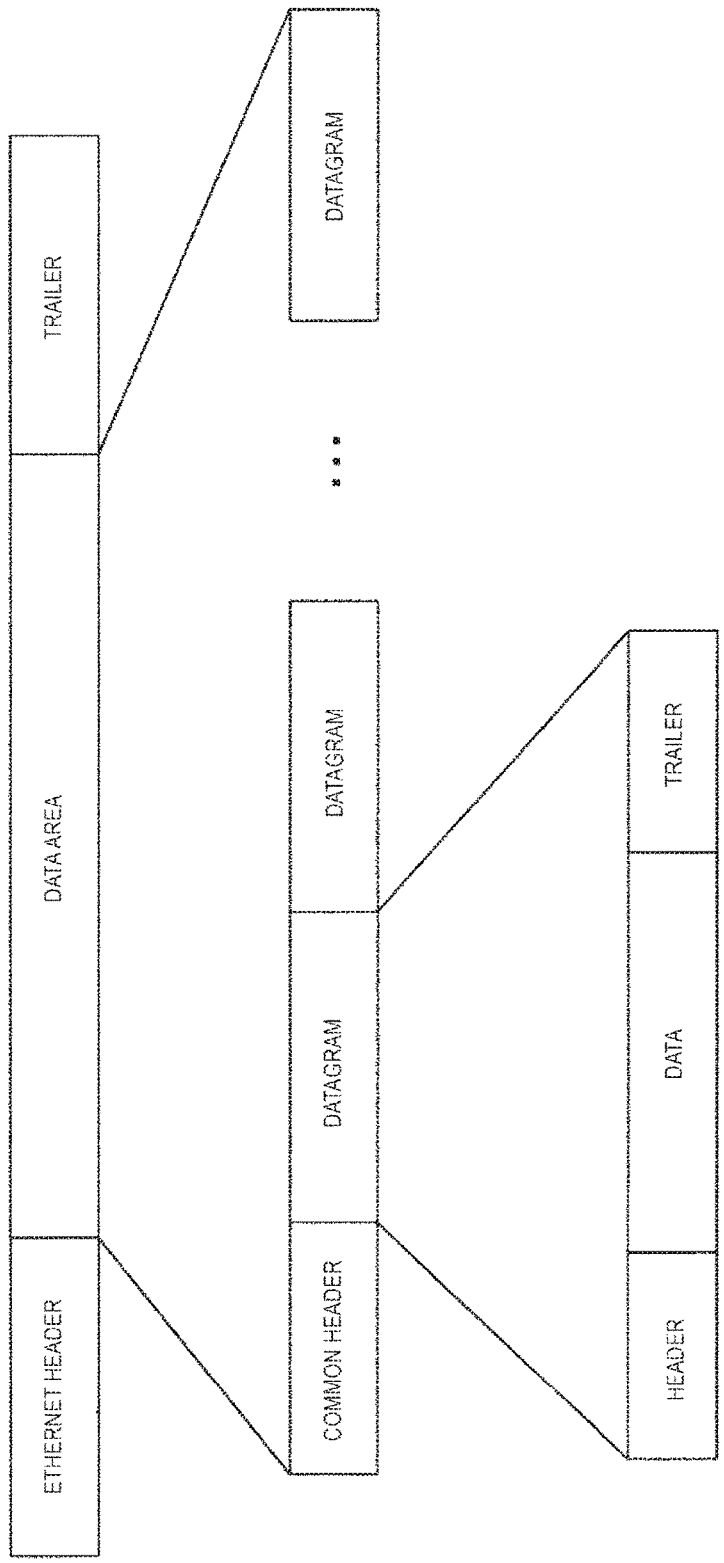

COMMUNICATION CONTROL DEVICE WITH DYNAMIC FRAGMENTING OF NON-REAL-TIME DATA

BACKGROUND OF THE INVENTION

Field of the Invention

The present invention relates to a communication control device.

Background Art

A configuration, in which one or more communication control devices control one or more control devices through a network, has been provided as a control system. The communication control devices send control commands or the like to the control devices through the network. Examples of a network which is used for such a control system include IEEE 802.3, RS-232C, RS-422, RS-485, CAN (registered trademark), Device Net, industrial Ethernet (registered trademark), IEC 61850, IEC 62439, Ethernet (registered trademark) AVB, and the like.

In order to reduce fluctuation (jitter) between arrival intervals of real-time packets and improve quality and reliability in a packet transmitting and receiving device which performs communication including non-real-time packets and real-time packets through a frame relay network, JP-A-2004-208119 discloses "an invention that includes an adjacency information table which stores a line speed (band information) of a counterparty device in a DLCI unit indicative of a sending destination of the frame relay network, that determines a fragment size of a non-real-time packet in a destination DLCI unit, determines a packet size which can be sent between real-time packet sending intervals, and sends the non-real-time packet by dividing the non-real-time packet by the size (fragment size). Therefore, delay of the real-time packet arrival interval and an occurrence of congestion on a reception side are prevented and the communication efficiency of the non-real-time packet is improved" (refer to abstract).

SUMMARY OF THE INVENTION

Accuracy of Sending Timing of Communication Control Device

In the system, as described above, in which one or more communication control devices control one or more control devices through a network, a configuration is provided in which a time synchronization protocol is applied and each of the control devices is operated based on a synchronized time. In such a configuration, high cycle accuracy is acquired in a sending timing of a control command in the communication control device in addition to the synchronization accuracy of each of the control devices. For example, in a case in which communication delays are different between the communication control device and the respective control devices, whether or not it is possible to receive the control commands from the communication control devices within the same control cycle is different for the respective control devices.

In Case of Time Division System, Cycle Accuracy of Communication Control Device is Directly Connected to Accuracy of Control Cycle In addition, in a case of a time division network system of allocating time, in which a network is used, for each control device in a time division manner, a method of defining a control cycle based on a synchronization instruction from the communication control device is generally used. In this case, the cycle accuracy of the sending timing of the control command in the communication control device directly influences the accuracy of the control cycle. If the cycle accuracy of the sending timing of the communication control device is bad and fluctuation in a communication cycle is large, a case in which the control cycle of the control system becomes short or long occurs, and thus the control performance of the control system is deteriorated.

In addition, in recent years, with the enlargement of application of IEEE 802.3 system to a control system, new requests are growing. That is, application to a control system in an ICT communication system which is represented by TCP/IP or the employment of a communication system which causes IEEE 802.3 to be high reliable has been requested. For example, standards which enable TCP/IP communication to be used exist in an industrial communication system defined in IEC 61784-2. In addition, in IEC 61850, TCP/IP communication is used for the purpose of setting and monitoring, and communication protocol, in which Ethernet (registered trademark) is directly used, is assumed for the purpose of controlling a cut-off instruction or the like. In addition thereto, IEC 62439 standardizes a system, such as redundant communication, of enabling IEEE 802.3 to be high reliable.

Influence of Non-Control Command

However, in a case in which, in a communication control device, a sending timing of a non-control command is immediately before the sending timing of the control command in TCP/IP, there is a possibility that the sending timing of the control command is delayed. The non-control command includes management information or work information, which is provided from the communication control device to the control device, and indicates an instruction which does not require high accuracy of a cycle but which is necessary to execute a control system. Specifically, the realization of TCP/IP communication of the control system is included.

Influence of Retransmission and Transmission

In addition, the above case may be a cause for delay in the sending timing of the control command with regard to the retransmission and transmission of the control command in addition to the non-control command. In a case in which a sending timing of retransmission and transmission is immediately before the sending timing of the control command, there is a possibility that the sending timing of the control command is delayed. The retransmission is performed by taking packet loss on the network into consideration, and thus the retransmission is useful to improve the data communicability from the communication control devices to the control device. Particularly, a predetermined bit error rate exists in a physical media of the network, and it is practically not possible to securely send entire packets. Therefore, in a system in which high reliability is required, a retransmission function is essential.

Furthermore, in a case in which a ring network is formed by communication devices, transmission packets from adjacent communication devices exist. The transmission packets may be causes for delay of the sending timing of the control command.

Solution Using Time Division System

The influence of the non-control command, the retransmission, and the transmission is handled by providing a dedicated network using time frame in a time division network system. In this case, if the non-control command, the retransmission, and the transmission are communicated in the time frame, the influence on the cycle accuracy of the sending timing of the control command is removed.

Problem for Releasing Time Division System

However, in the method, even in a case in which the non-control command and the retransmission do not exist, the dedicated time frame should be assigned, and thus an unnecessary network band is consumed. Particularly, the communication cycle becomes long due to the influence of the time frame, and thus there is a possibility that the control cycle becomes long as a result. As the control cycle becomes longer, the control performance becomes more deteriorated, thereby being undesirable.

In addition, in the non-control command, it is difficult to uniquely determine a data size by the nature of the non-control command, and thus it is not possible to uniquely determine the time frame for the non-control command. Therefore, the worst value is assumed, there is a tendency for the time frame to be long, and there is a possibility that the control cycle becomes longer as a result. In addition, even in a case in which a maximum value is determined and division is performed on the non-control command, there is a possibility that an unnecessary division process and a combination process are necessary, and thus a problem occurs in that computer resources, such as hardware and software, are unnecessarily consumed.

In addition, as the technology disclosed in JP-A-2004-208119, if the non-control command is fragmented according to the line speed of a counterparty communication device, it is possible to avoid the maintenance of the delay of the arrival interval of the control command and the occurrence of congestion. However, in a case in which the non-control command appears immediately before the sending of the control command or in a case in which the retransmission and the transmission are performed, the sending timing of the control command is delayed. In addition, if the non-control command is not provided before a period in which sending is possible and which is assigned to the non-control command, the sending is not possible, and thus waste occurs in communication band efficiency.

In order to solve the above problems, an object of the present invention is to provide a communication control device which enables a communication process of communication data, in which real-time properties are not required, without interfering sending of communication data, such as a control command, in which the real-time properties are required.

According to an aspect of the present invention, there is provided a communication control device including: a real-time communication status extraction unit that acquires a communication timing of real-time data in which real-time properties are required; a dynamic fragment size determination unit that acquires a fragment size of sending data which can be sent until the communication timing acquired by the real-time communication status extraction unit; a fragment processing unit that fragments non-real-time data, in which the real-time properties are not required, to have at least a fragment size which is equal to or less than the fragment size acquired by the dynamic fragment size determination unit; and a communication unit that sends the non-real-time data, which is fragmented by the fragment processing unit, before the communication timing of the real-time data.

According to the present invention, it is possible to perform a communication process of communication data, in which the real-time properties are not required, without interfering the sending of communication data in which the real-time properties are required.

BRIEF DESCRIPTION OF THE DRAWINGS

FIG. 20 is a diagram illustrating a packet format in the embodiment of the present invention.

DETAILED DESCRIPTION OF THE INVENTION

Hereinafter, an embodiment of a communication control device in which control performance and convenience are improved together.

First Embodiment

Example of System

Figure 1:
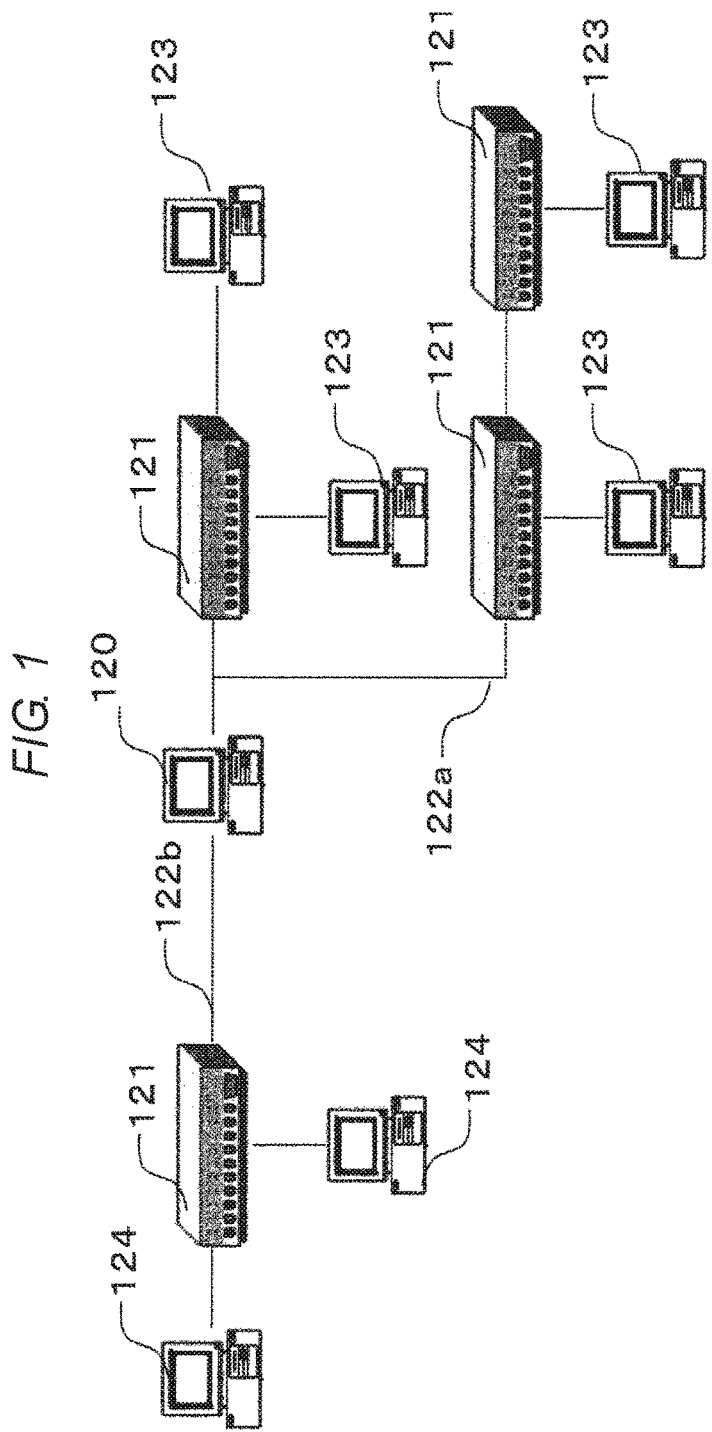
FIG. 1 is a configuration diagram illustrating a system using an embodiment of the present invention.

FIG. 1 illustrates an example of a system which is configured by using a communication control device 120 to which the present invention is applied.

The communication control device 120 is connected to other network relay devices 121 or communication devices 123 and 124 through a network 122, and transmits and receives control commands, management information, and the like.

A network switch, a router, a gateway, a switch which is capable of rewriting packet and path control in a Software Defined Network may be provided as a network relay device 121.

IEEE 802.3, various industrial networks, IEC 61784, IEC 61158, IEC 61850, IEC 62439, Ethernet (registered trademark) AVB, Controller Area Network (CAN, registered trademark), Device Net, RS-232C, RS-422, RS-485, or the like may be exemplified as the network 122.

The communication device 123 receives a control command of the communication control device 120, and performs a control process. In addition, if necessary, the communication device 123 communicates measurement information, management information, or the like to the communication control device, the communication device, and the network relay device 121 which form the network 122. An industrial control device, a vehicle Engine Control Unit (ECU), a protection control device included in a substation monitoring control system, an Intelligent Electronic Device (IED), a Merging Unit (MU), a servo controller, a servo amplifier, a servo motor, or the like may be exemplified as the communication device 123.

The communication device 124 has managing and monitoring functions in the control system, communicates with the communication control device 120, the network relay device 121, and the communication device 123, and monitors setting and status. A Human Machine Interface (HMI) function, Supervisory Control and Data Acquisition (SCADA), a Distributed Control System (DCS), a storage server, or the like may be exemplified as the communication device 124.

Meanwhile, the respective devices may be provided in plural or may be not provided in plural (for example, a case in which the network 122 is formed without using the network relay device 121). In addition, description is performed by distinguishing the communication control device 120, the communication device 123, and the communication device 124 from each other. However, the advantage of the present invention is not lost even though the communication device 123, the communication device 124, and the communication control device 120 respectively have different functions.

Hardware Configuration

Figure 2:
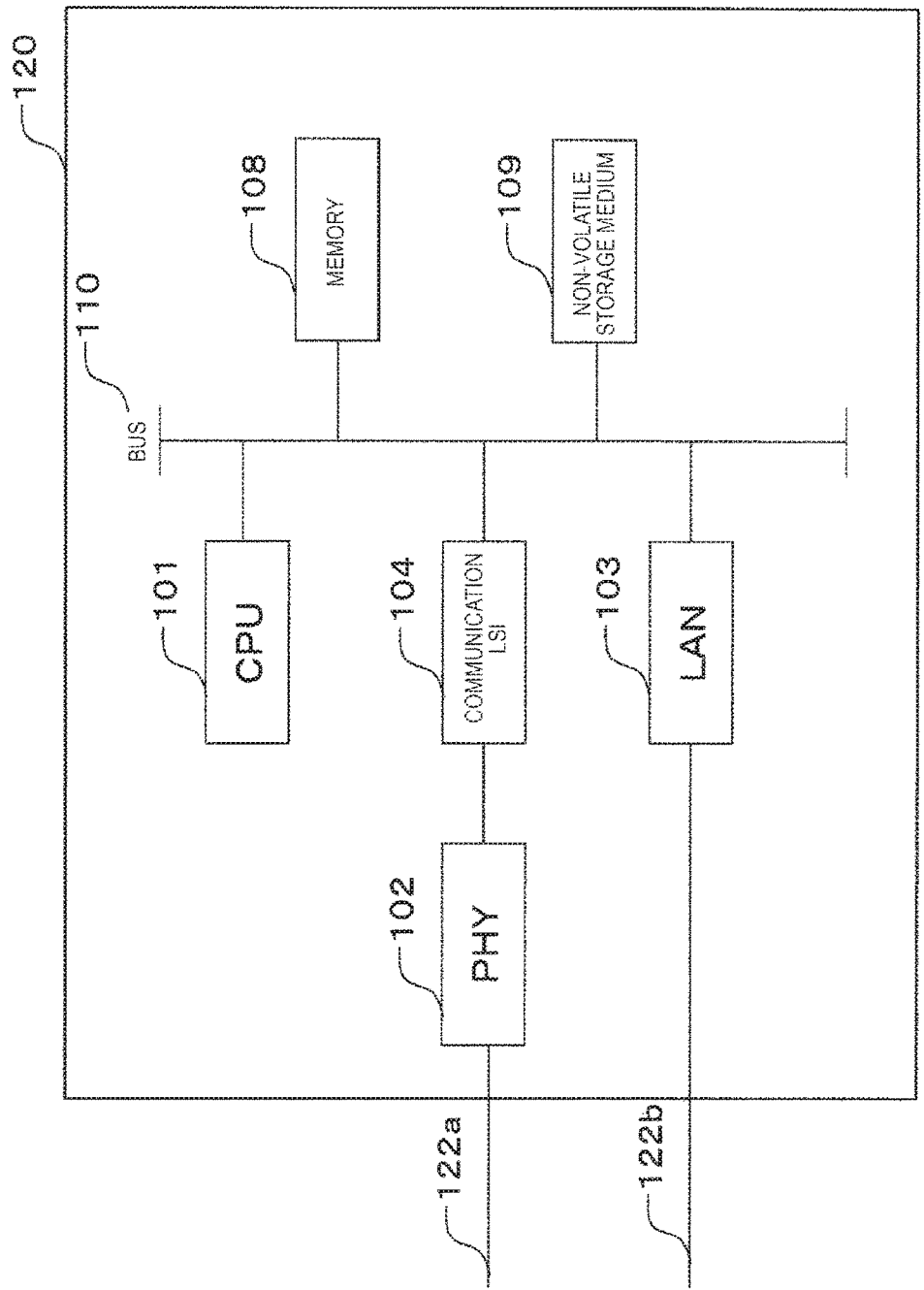
FIG. 2 is a configuration diagram illustrating hardware according to the embodiment of the present invention.

FIG. 2 illustrates the hardware configuration of the communication control device 120 to which the present invention is applied.

A CPU 101 transmits a program from a non-volatile storage medium 109 to a memory 108 and executes the program. An operating system (hereinafter, referred to as an "OS") or an application program, which is operated on the OS, may be exemplified as an execution processing program. A multicore CPU or a many-core CPU may be used as the CPU 101.

A PHY 102 is a transceiver IC on which a function of enabling communication with the network 122 is mounted. A PHY (physical layer) chip of IEEE 802.3 may be exemplified as the communication standard which is provided for the PHY 102. Meanwhile, in the configuration of FIG. 2, the PHY 102 is connected to a communication LSI 104, and thus a process of Media Access Control (MAC) layer in IEEE 802.3 is included in the communication LSI 104. However, even in a configuration in which an IC for providing an MAC function is arranged between the communication LSI 104 and the PHY 102 or a configuration in which the IC for providing the MAC function and a communication IC combined with the PHY 102 are connected to the communication LSI 104, the advantage of the present invention is not lost.

A LAN 103 is a transceiver IC on which a function of enabling communication with the network 122 is mounted. The LAN 103 receives a communication request from a program which operates on the CPU 101, and communicates with the network 122. As an implementation example of the LAN 103, a Media Access Control (MAC) chip, a PHY (physical layer) chip, a composite chip of the MAC and the PHY, or an IC, such as an FPGA, a CPLD, an ASIC, or a gate array, in conformity with the IEEE 802.3 standards may be exemplified. Meanwhile, the LAN 103 may be included in a chipset which controls information path in the CPU 101 or a computer.

The communication LSI 104 receives a sending request and sending data from a program which operates on the CPU 101, and sends the sending request and the sending data to the network 122 using the PHY 102. In addition, the communication LSI 104 transmits the data, which is received from the network 122, to the CPU 101, the memory 108, and the non-volatile storage medium 109 through a bus 110. As an implementation example of the communication LSI 104, the IC, such as an FPGA, a CPLD, an ASIC, or a gate array, is exemplified. Otherwise, the communication LSI 104 may be formed by being integrated with the CPU 101. The communication LSI 104 may be a communication device, in which a MAC layer and a PHY layer are included, in conformity with IEEE 802.3 and a PHY function may be included in the communication LSI 104.

The memory 108 is a temporary storage area which is used for the CPU 101 to operate, and the OS, an application program, and the like, which are transmitted from the non-volatile storage medium 109, may be stored therein.

The non-volatile storage medium 109 is an information storage medium, and is used to preserve a program for operating the OS, an application, a device driver, or the CPU 101 and to preserve a result of program execution. A Hard Disk Drive (HDD), a Solid State Drive (SSD), or a flash memory may be exemplified as the non-volatile storage medium 109. In addition, as an external storage medium which is easily detachable, the use of a Floppy (registered trademark) Disk (FD), a CD, a DVD, a Blu-ray (registered trademark), a USB memory, or a compact flash (registered trademark) is exemplified.

The bus 110 connects the CPU 101, the LAN 103, the communication LSI 104, the memory 108, and the non-volatile storage medium 109, respectively. A PCI bus, an ISA bus, a PCI Express bus, a system bus, a memory bus, an on-chip bus, or the like may be exemplified as the bus 110.

Meanwhile, as the hardware configuration, the IC, the CPU, or a System on chip (SoC) FPGA, in which any one or more of the CPU 101, the PHY 102, the LAN 103, the communication LSI 104, the memory 108, and the non-volatile storage medium 109 are integrated, may be used.

Meanwhile, the PHY 102, the LAN 103, and the communication LSI 104 are interfaces which are connected to the network 122, respectively. If the configuration of the present invention is included in the LAN 103, the communication LSI 104 and the PHY 102 may include the LAN 103 or the LAN 103 illustrated in FIG. 2 may include the communication LSI 104 and the PHY 102. FIG. 2 illustrates a network 122a as a network which is connected to the communication device 123 and a network 122b as a network which is connected to the communication device 124.

Description of Respective Functional Units

Figure 3:
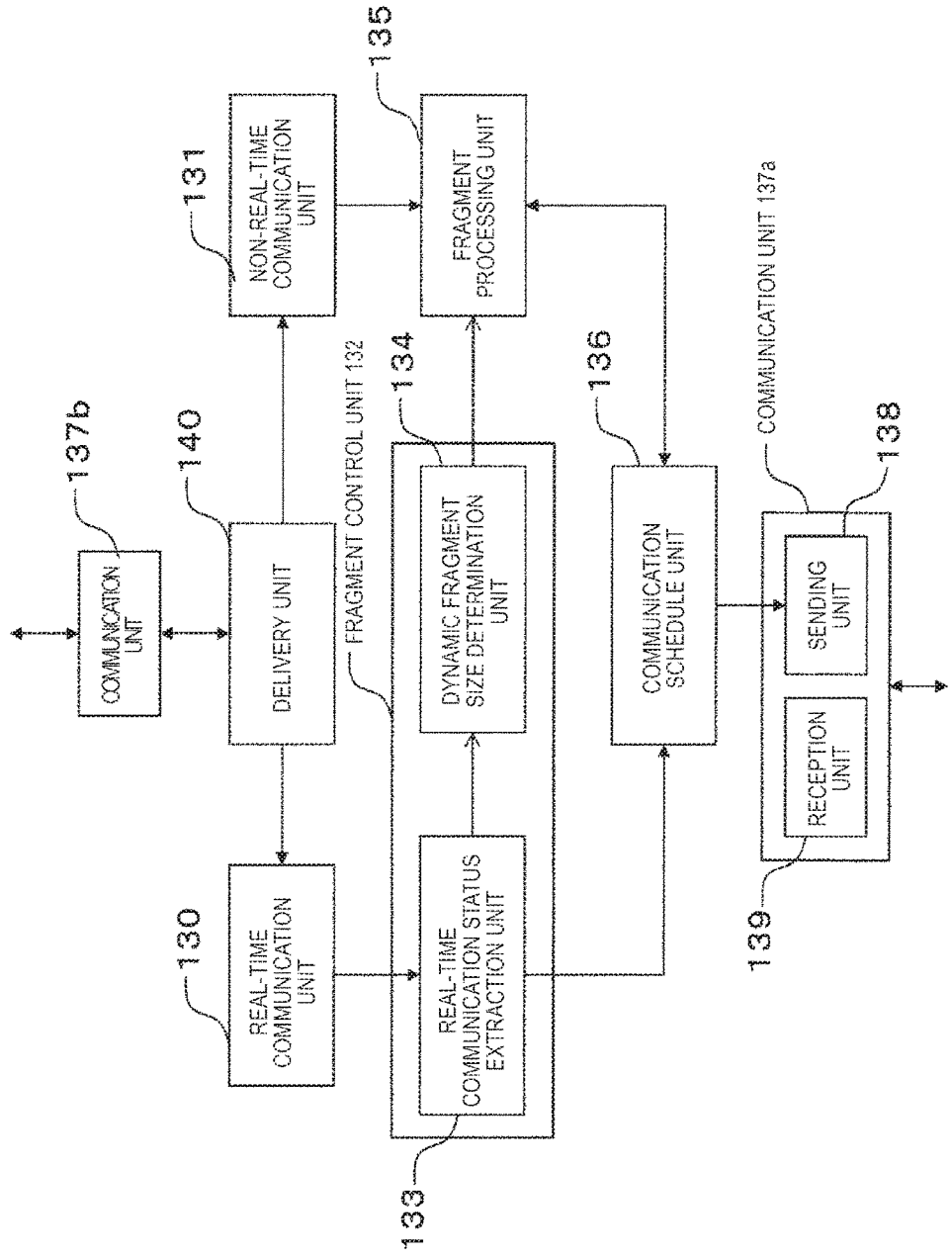
FIG. 3 is a functional configuration diagram illustrating the embodiment of the present invention.

FIG. 3 is a functional configuration diagram illustrating of the communication control device 120 to which the present invention is applied.

A communication unit 137 is a functional unit which is connected to the network 122 and is used to perform communication in conformity with a communication protocol of the network 122. The communication unit 137 includes any one or more of the PHY 102, the LAN 103, and the communication LSI 104.

A sending unit 138 is a sending function unit in the communication unit 137, and sends a packet from the communication control device 120 to the network 122. The sending unit 138 includes any one or more of the PHY 102, the LAN 103, and the communication LSI 104.

A reception unit 139 is a reception function unit in the communication unit 137, and receives the packet sent from the network 122. The reception unit 139 includes any one or more of the PHY 102, the LAN 103, and the communication LSI 104.

A delivery unit 140 identifies data, which is input to the communication LSI 104 or the LAN 103, according to a predetermined method, and delivers the data to a non-real-time communication unit 131, a real-time communication unit 130, or both the non-real-time communication unit 131 and the real-time communication unit 130. A method of expressing an identifier in a predetermined location of input data or a method of designating an identifier when the data is input to the communication LSI 104 or the LAN 103 is exemplified as a method of determining a functional unit in a delivery destination. As a detailed example of the latter method, in a case in which the communication LSI 104 or the LAN 103 is formed as a PCI device, a method of performing distinction according to an address space shown in a PCI bus space and a method of performing distinction by installing burst transmission requests to the communication LSI 104 or the LAN 103 in different registers are exemplified.

A timer 141 notifies each functional unit of time information and the elapse of a predetermined period (not shown in the drawing). A dedicated timer device, a hardware clock, or a software clock by software which operates on the CPU 101 may be exemplified as the timer 141.

A real-time communication unit 130 is a functional unit that stores real-time data, such as an operation instruction or a measurement information acquisition request, which is sent from the communication control device 120 to the communication device 123 with time restriction. The real-time communication unit 130 receives the real-time data from the delivery unit 140, and transmits the real-time data to a fragment control unit 132.

A real-time data sending request is generated on a predetermined cycle or is generated at an arbitrary timing. A data size may be changed for each cycle. Meanwhile, in a case in which the real-time data is generated at the arbitrary timing, it is configured such that a predetermined unit knows time until subsequent sending before the sending. For example, a configuration may be provided in which, relevant information is added or stored to or in the real-time data as the time until subsequent sending, or the relevant information is notified to a functional unit which requires the information from the real-time communication unit 130 or the delivery unit 140.

A cycle in which the real-time data is sent is managed using the timer 141.

Meanwhile, the format of the real-time data in the real-time communication unit 130 may be a format which includes only data or may be a format to which a header or the like is given in conformity with the communication protocol of the network 122. In a case in which management is performed using the format which includes only data, information, such as a header, may be given by the communication unit 137 or may be given by a communication schedule unit 136 or the fragment control unit 132.

In addition, in the case in which the real-time data is managed in conformity with the communication protocol of the network 122, reception may be performed from the delivery unit 140 by the relevant format. Otherwise, only data may be received from the delivery unit 140 and the header may be given so as to conform to the communication protocol of the network 122 in the real-time communication unit 130.

The non-real-time communication unit 131 may be formed as software which operates on the CPU 101, or may be formed as hardware in the communication LSI 104 or the LAN 103.

The non-real-time communication unit 131 is a functional unit that stores non-real-time data, such as management information or work information, which is sent without time restriction from the communication control device 120 to the communication device 123. The non-real-time communication unit 131 receives the non-real-time data from the delivery unit 140, and transmits the non-real-time data to a fragment processing unit 135.

A non-real-time data sending request is generated at an arbitrary timing, and is arbitrary for the data size.

Meanwhile, the format of the non-real-time data in the non-real-time communication unit 131 may be a format which includes only data or a format to which a header or the like is given so as to conform to the communication protocol of the network 122. In a case in which management is performed using the format which includes only data, information, such as a header, may be given by the communication unit 137, or may be given by the schedule unit 136 or the fragment processing unit 135.

In addition, in a case in which the non-real-time data is managed by the format in conformity with the communication protocol of the network 122, reception may be performed from the delivery unit 140 by the relevant format. Otherwise, only data may be received from the delivery unit 140 and a header may be given so as to conform to the communication protocol of the network 122 in the non-real-time communication unit 131.

The non-real-time communication unit 131 may be formed as software which operates on the CPU 101, or may be formed as hardware in the communication LSI 104 or the LAN 103.

In addition, the real-time communication unit 130 and the non-real-time communication unit 131 may be formed using a multicore CPU or one CPU core of a many-core CPU.

The fragment control unit 132 includes a real-time communication status extraction unit 133 and a dynamic fragment size determination unit 134, transmits the real-time data from the real-time communication unit 130 to the communication schedule unit 136, and notifies the fragment processing unit 135 of a fragment size.

The real-time communication status extraction unit 133 extracts a real-time communication status relevant to the real-time data transmitted from the real-time communication unit 130, and notifies the dynamic fragment size determination unit 134 of the real-time communication status. The real-time data is transmitted to the communication schedule unit 136.

As the real-time communication status which is notified to the dynamic fragment size determination unit 134, a remaining time until a subsequent cycle, a remaining time until subsequent sending, a relevant communication cycle, occurrence of a communication completion event, the data size of a packet, the communication processing time of the packet (transmission times in the respective functional units illustrated in FIG. 3, the total of the transmission times, or time which is taken for sending from the communication unit 137), or a time slot period which is allocated for predetermined communication is exemplified. In a case in which the real-time communication status includes time, a processing time for transmitting and detecting the real-time data by the real-time communication status extraction unit 133, the communication schedule unit 136, and the communication unit 137 may be reduced in advance. Otherwise, notification processing time of the real-time communication status extraction unit 133 or reception processing time of the dynamic fragment size determination unit 134 may be reduced. In the same manner, an inter-frame gap which is determined in conformity with the standards of the network 122 may be reduced. In addition, in a case in which the real-time communication status includes the data size of the packet, predetermined data length may be added or reduced. For example, if the addition of a header of a predetermined communication protocol in the latter-stage functional unit is previously known, a header size may be added.

In a case in which the real-time data is generated at an arbitrary timing, the time until the subsequent sending is extracted by the real-time communication status extraction unit 133. As an extraction method, the information is added to the real-time data or stored and then extraction from the information may be performed, or a notification is provided from the real-time communication unit 130 to the real-time communication status extraction unit 133.

The dynamic fragment size determination unit 134 determines the fragment (fragmenting) size of the non-real-time data based on the real-time communication status which is notified by the real-time communication status extraction unit 133, and notifies the fragment processing unit 135 of the fragment size.

Figure 4:
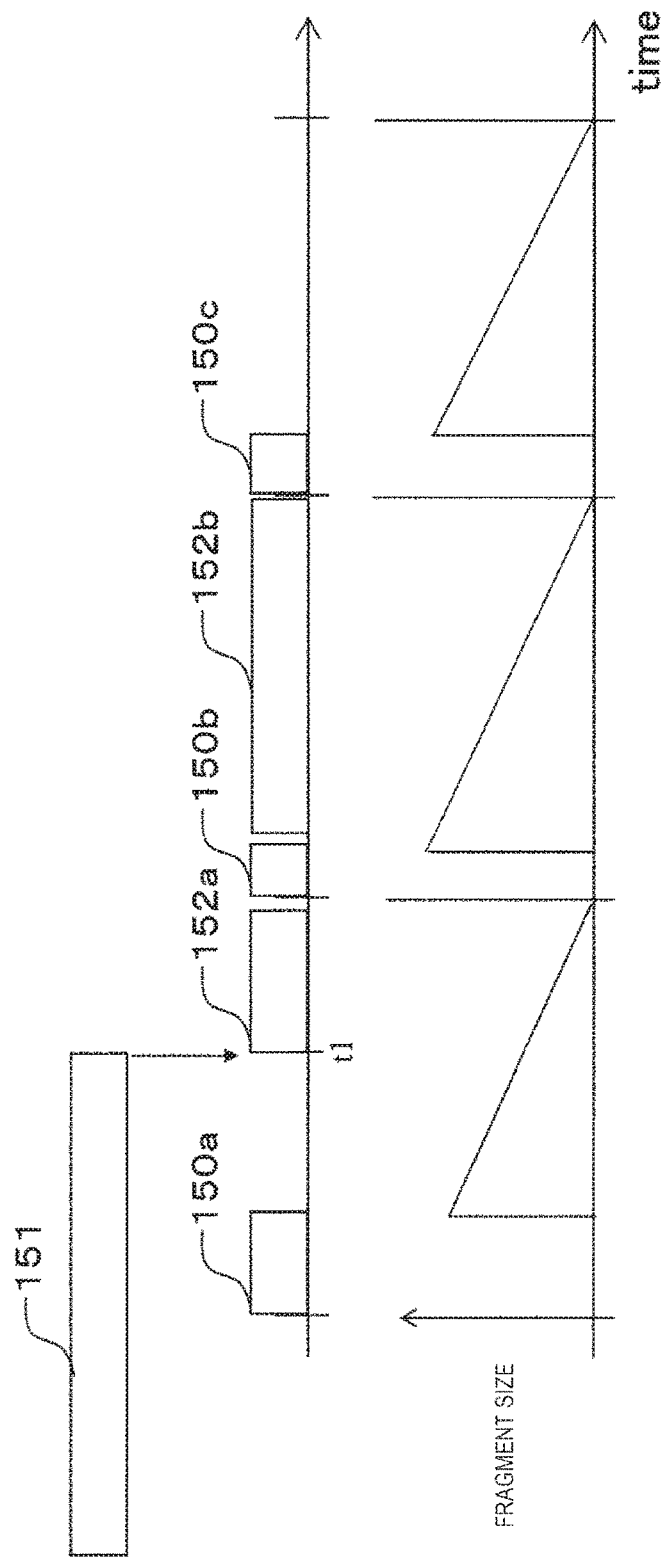
FIG. 4 is a diagram illustrating a packet sending process in the embodiment of the present invention.

FIG. 4 illustrates an example of a method for determining the fragment size in the dynamic fragment size determination unit 134.

In FIG. 4, a value, which is acquired using the following Equation 1 based on a remaining time Tr until time of the subsequent sending of the real-time data and a non-real-time data sending processing time Tp for unit data size, is assumed as a fragment size Sf which is the data size that can be sent in the remaining time Tr.

$$Sf = Tr/Tp - \alpha \quad \text{(Equation 1)}$$

Here, $\alpha$ is a margin. For example, if it is assumed that Tr=10 microseconds, Tp=20 nanoseconds/byte, and $\alpha$=10 byte, Sf=10 microseconds/(20 nanoseconds/byte)−10 byte=490 byte. Meanwhile, the margin $\alpha$ may be a margin for the remaining time Tr and the non-real-time data sending processing time Tp.

Otherwise, in a case in which the real-time data is generated at an arbitrary timing, the same calculation is performed while Tr in Equation 1 is the time until the subsequent sending.

Method of Determining Fragment Size

The fragment size may be monotone decreasing for the remaining time as in FIG. 4, or may have a step shape by dividing the remaining time into fixed ranges such that values in the fixed ranges are constant. With the step shapes, an advantage of decreasing the load of calculation of fragment size Sf can be expected.

Otherwise, if the minimum value of a fragment is allowed to be set and a result of calculation of the fragment size, which is already described in FIG. 4 becomes equal to or less than a minimum value, a notification that fragmenting is not possible or the fragment size is 0 may be provided to the fragment processing unit 135. In this case, a unit (register setting, a dedicated signal line, or the like) for setting the minimum value of the fragment size is provided in the software which operates on the CPU 101, the communication LSI 104 and the LAN 103 which realize the dynamic fragment size determination unit 134, and the like.

Meanwhile, as information which is notified to the fragment processing unit 135 by the dynamic fragment size determination unit 134, any one or more information which indicates that fragmenting is not possible (situation in which sending is not possible no matter how to fragment the least), information which indicates that fragmenting is not necessary (sending is possible without fragmenting), and information which indicates that fragment calculation is not possible (the calculation of the fragment size is not possible) may be exemplified in addition to the value of the fragment size. As a method of expressing the pieces of information, a dedicated signal connection may be provided on a circuit or a predefined value may be used as the fragment size. For example, a fragment size of 0, which is used to indicate that fragmenting is not possible, may be exemplified.

In addition, in a case in which the sending of the real-time data occurs at an arbitrary timing, subsequent sending is not always clear at a point of time in which certain real-time data is sent. In this case, at a point of time in which the time until the subsequent sending becomes clear, the real-time communication unit 130 notifies the real-time communication status extraction unit 133 of the remaining time. A configuration, in which the real-time communication status extraction unit 133 provides a notification that the remaining time is not determined until the remaining time becomes clear to the dynamic fragment size determination unit 134 and the dynamic fragment size determination unit 134 provides a notification that fragmenting is not necessary until the remaining time becomes clear to the fragment processing unit 135, is exemplified. Otherwise, if the real-time communication unit 130 can acquire the time until the subsequent sending of the real-time data in advance by predetermined time, the time is notified from the real-time communication unit 130 to the real-time communication status extraction unit 133 and is notified from the real-time communication status extraction unit 133 to the dynamic fragment size determination unit 134, and the dynamic fragment size determination unit 134 notifies the fragment processing unit 135 of the fragment size based on the time.

If the dynamic fragment size determination unit 134 calculates a data size which can be sent without interfering a subsequent real-time data sending process and notifies the fragment processing unit 135 of the data size as above, the fragment processing unit 135, which will be described later, can fragment the non-real-time data into appropriate data sizes.

The fragment processing unit 135 fragments the non-real-time data according to the fragment size which is notified by the dynamic fragment size determination unit 134 of the fragment control unit 132. In a case of fragmenting, information which enables the original non-real-time data to be restored is added. As the added information, an identifier of the non-real-time data, information indicative of a fragment location in the original non-real-time data (an order, an offset location from the head in byte unit, or the like), or a fragment data size may be exemplified. As a fragment implementation example, Internet Protocol (IP) may be exemplified. An IP header includes, as the added information, an identifier of the original data, a flag (which indicates that division is not possible or indicates whether or not of the last fragment), and a location offset of the fragment in byte unit.

Meanwhile, a value, which is acquired by subtracting the size of the added information from the fragment size which is notified by the dynamic fragment size determination unit 134, may be fragmented from the non-real-time data, or a value, from which the size of the added information is subtracted in advance, may be notified to the fragment processing unit 135 by the dynamic fragment size determination unit 134. In a latter case, the dynamic fragment size determination unit 134 includes a unit for setting and acquiring the size of the added information.

If the notification, which is provided from the dynamic fragment size determination unit 134, indicates that fragmenting is not necessary, the fragment processing unit 135 sends the non-real-time data without fragmenting. Otherwise, if fragmenting is not possible, the non-real-time data is sent without fragmenting, the non-real-time data is fragmented into predetermined sizes, or the transmission of the non-real-time data to the communication schedule unit 136 is stopped.

In a case in which the non-real-time data is fragmented into the predetermined sizes, a case in which fragmenting is performed into possible small sizes such that the real-time data can be sent at an arbitrary point of time is exemplified. Meanwhile, a case, in which a status that fragment calculation is not possible and each piece of information of a relevant process performed by the fragment processing unit 135 are notified to the software which operates on the CPU 101 or can be acquired from the software which operates on the CPU 101, is exemplified.

Otherwise, even in a case in which setting is made such that the non-real-time data cannot be fragmented, the fragment processing unit 135 does not fragment the non-real-time data. In addition, a case, in which the fragment processing unit 135 does not fragment the non-real-time data even though the non-real-time data coincides with a predetermined condition, is exemplified. For example, there is a case in which the non-real-time data is a predetermined communication protocol or a case in which a parameter on the communication protocol has a predetermined value. The coinciding condition may be determined by the fragment processing unit 135 or may be determined by the non-real-time communication unit 131 and the result of the determination may be given to the non-real-time data. In the case in which setting is made such that fragmenting is not possible, the communication schedule unit 136 determines whether or not the non-real-time data can be sent.

In the fragmenting process performed by the fragment processing unit 135, fragmenting may be not always performed by the notified fragment size in a case in which the notification provided from the dynamic fragment size determination unit 134 is a valid fragment size. Specifically, fragmenting is performed by a size which is equal to or less than the notified fragment size. For example, in a case in which data that is important on an application within a size range, which is less than the fragment size notified by the dynamic fragment size determination unit 134, exists in the non-real-time data, a configuration is illustrated in which the important data is fragmented in advance and is notified to the communication schedule unit 136.

Case of Packet which Includes Sub-Packet

In a case in which the non-real-time data includes a plurality of lower components in the fragment process performed by the fragment processing unit 135, it is necessary to fragment the lower components. For example, a packet in Communication Profile Family (CPF) 12 of IEC 61784-2 includes a plurality of datagrams (FIG. 20).

As illustrated in FIG. 20, the packet in CPF of IEC 61784-2 includes an Ethernet (registered trademark) header, a data area, and a trailer, and the data area includes a common header and a plurality of datagrams. Each of the datagrams includes a datagram header and a trailer, and a communication protocol, such as TCP/IP, is capsulized as data in the datagram. Therefore, in a case in which fragmenting is performed by the fragment processing unit 135, it is necessary to perform fragmenting on the data area within the datagram while maintaining the configuration illustrated in FIG. 20.

In the case, if the number of datagrams increases, a fixed length of the header or the like of the datagram pertains, and thus there is a case in which the fragment size which is notified from the dynamic fragment size determination unit 134 is exceeded. Therefore, in a case in which the fragmenting is performed by the fragment processing unit 135, in addition to fragmenting performed on the datagram, fragmenting is performed such that the number of datagrams is reduced and the fragment size, which is notified from the dynamic fragment size determination unit 134, is not exceeded.

It is preferable that data processing time in the real-time communication status extraction unit 133, the fragment processing unit 135, the communication schedule unit 136, and the communication unit 137 is fixed or uniquely determined according to the data size, thereby being processing time which can be estimated. As the processing method, the amount of transmission processing data for unit time within a digital IC included in the real-time communication status extraction unit 133 is fixed (for example, in a case of an operation of 100 MHz at 4 byte/clock, (rounding up byte data size in 4-byte unit)/(4 byte/clock)×($1/100$ MHz) becomes the processing time) or a configuration including a process of fixing the number of steps of software which processes the predetermined data size (for example, if three steps are necessary for processing 4 bytes in an operation of 100 MHz, (rounding up byte data size in 4-byte unit)×3 step× ($1/100$ MHz) becomes the processing time) may be exemplified.

The communication schedule unit 136 determines whether or not to permit each of the sending requests of the real-time data and the non-real-time data based on the sending data processing time of the real-time communication unit 130 and the non-real-time communication unit 131, in which the sending request exists, and the real-time communication status which is extracted by the real-time communication status extraction unit 133. The data sizes of the real-time data and the non-real-time data are respectively notified to the communication schedule unit 136, together with the sending requests. Therefore, the sending data processing time is calculated in the communication schedule unit 136. If the sending of the non-real-time data does not interfere in the real-time data, the non-real-time data sending request is permitted.

In a case in which both a notification that the sending of the non-real-time data is possible and the non-real-time data sending request are established, the non-real-time data is transmitted to the communication unit 137.

A case in which the communication schedule unit 136 includes any one or more of software which operates on the CPU 101, the PHY 102, the LAN 103, and the communication LSI 104 is exemplified.

As described above, if the communication schedule unit 136 determines whether or not the fragmented non-real-time data can be actually sent, it is possible to more securely prevent a non-real-time data sending process from interfering in the real-time data sending process.

A schedule function of the communication schedule unit 136 will be described. Meanwhile, non-real-time data of the schedule function below includes fragmented data.

If the non-real-time data is not transmitted to the communication unit 137, a notification that the sending of the real-time data is possible is provided. If the non-real-time data is transmitted, a notification that the sending of the real-time data is not possible is provided. In a case in which both the notification that the sending of the real-time data is possible and the real-time data sending request are established, the real-time data is transmitted to the communication unit 137.

In contrast, in a case in which the non-real-time data sending process does not cause the delay of the sending of the real-time data while the real-time data is not transmitted to the communication unit 137 and a sending request from the real-time data does not exist, a notification that the sending of the non-real-time data is possible is provided. In a case in which the time Tr until subsequent sending of the real-time data is compared with a non-real-time data sending processing time Tn and the following Equation 2 is established, the non-real-time data sending request is permitted.

$$Tr > Tn + \alpha \quad \text{(Equation 2)}$$

Here, α is a margin. That is, the non-real-time data sending processing time is shorter than the time Tr until subsequent sending of the real-time data, the non-real-time data sending request is permitted.

The non-real-time data sending processing time Tn is calculated by the following equation.

$$Tn = Ts + Te + \alpha \quad \text{(Equation 3)}$$

Here, Ts is the sending data processing time of the communication schedule unit 136, Te is the sending data processing time of the communication unit 137, and α is the margin.

The sending data processing time Ts of the communication schedule unit 136 is acquired by the following equation.

$$Ts = Sd/Ps + \alpha \quad \text{(Equation 4)}$$

Here, Sd is the size of the non-real-time data, Ps is the processing performance of the communication schedule unit 136, and α indicates the margin.

Meanwhile, in a case in which a header in conformity with the communication protocol of the network 122 is given to the sending data in the communication schedule unit 136, the processing time Tn is calculated by the following equation while the processing time is taken into consideration, $$Tn = Sd/P + B \quad \text{(Equation 5)}$$

B is a time, in which the header or the like is given, and is an item which is independent from the data size Sd. Otherwise, in a case in which the sending data includes a plurality of sub data and process is performed for each sub data, B is an item which depends on the number of sub data. In addition, B may include a data processing time calculation time.

For example, in a case in which IEEE 802.3 of 100 Mbps is used, the sending data processing time Te of the communication unit 137 is calculated according to the following equation.

$$Te = Sd/100 \text{ Mbps} + C \quad \text{(Equation 6)}$$

C is the margin, and may include the inter-frame gap of IEEE 802.3.

Sending Processing Procedure

Figure 5:
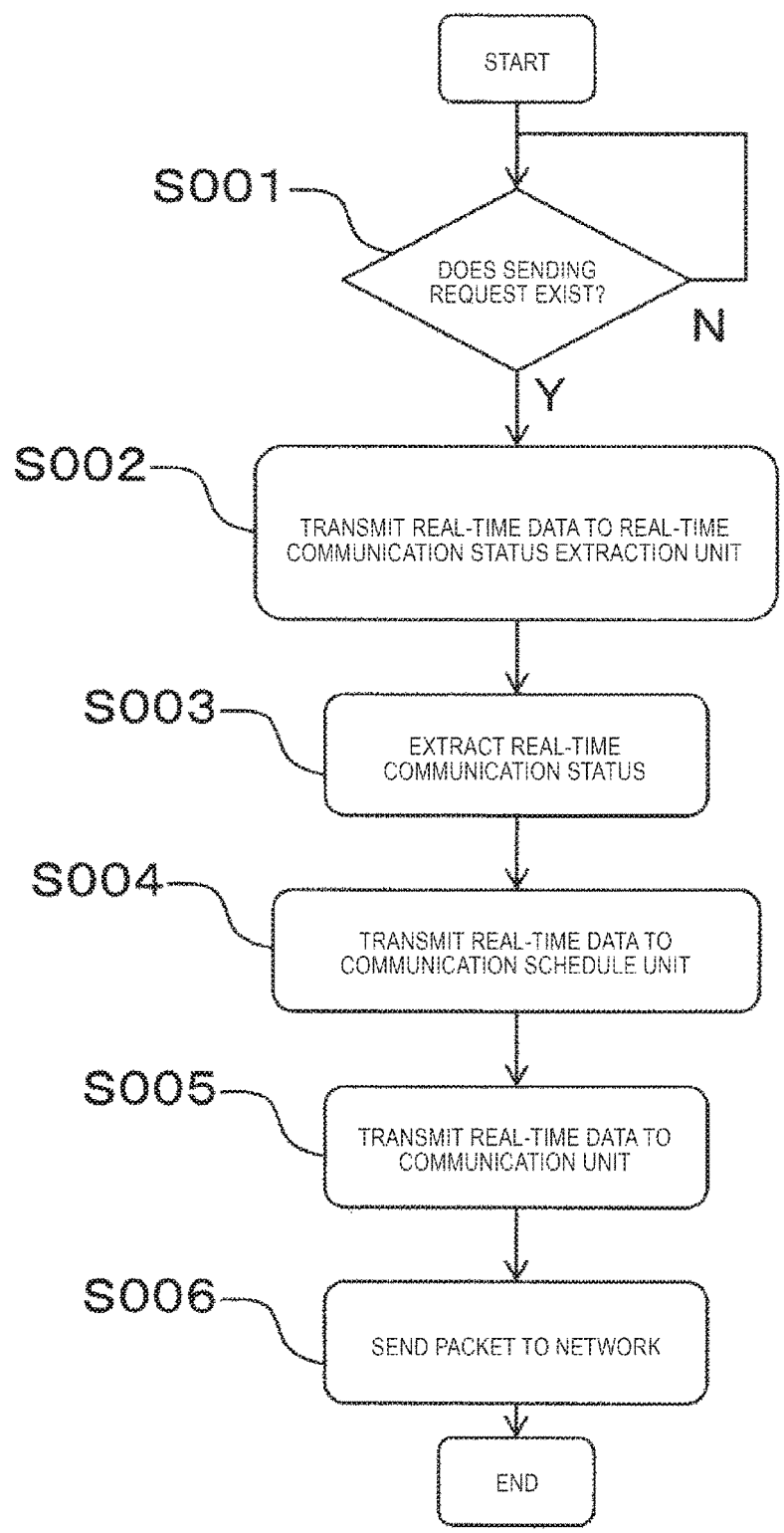
FIG. 5 is a flowchart illustrating an execution procedure in the embodiment of the present invention.

Hereinabove, the function and operation of each of the functional units have been described. The real-time data sending processing procedure which is represented by the control command is illustrated in FIG. 5.

First, the real-time communication unit 130 determines whether or not a real-time data sending request exists (S001). There are cases in which the real-time data is sent from the communication control device 120 and is communicated from the communication device 124. In step S001, if the sending request exists, the real-time data is transmitted to the real-time communication status extraction unit 133 (S002). If the sending request does not exist, a waiting process is performed. Subsequently, the real-time communication status extraction unit 133 extracts a real-time communication status from the real-time data (S003). The extracted real-time communication status is used to determine the fragment size by the dynamic fragment size determination unit 134. Subsequent to step S003, the real-time communication status extraction unit 133 transmits the real-time data to the communication schedule unit 136 (S004). The communication schedule unit 136 transmits the received real-time data to the communication unit 137 (S005). The communication unit 137 forms the real-time data by a packet format in conformity with the communication protocol of the network 122, and sends the real-time data to the network 122 (S006).

Figure 6:
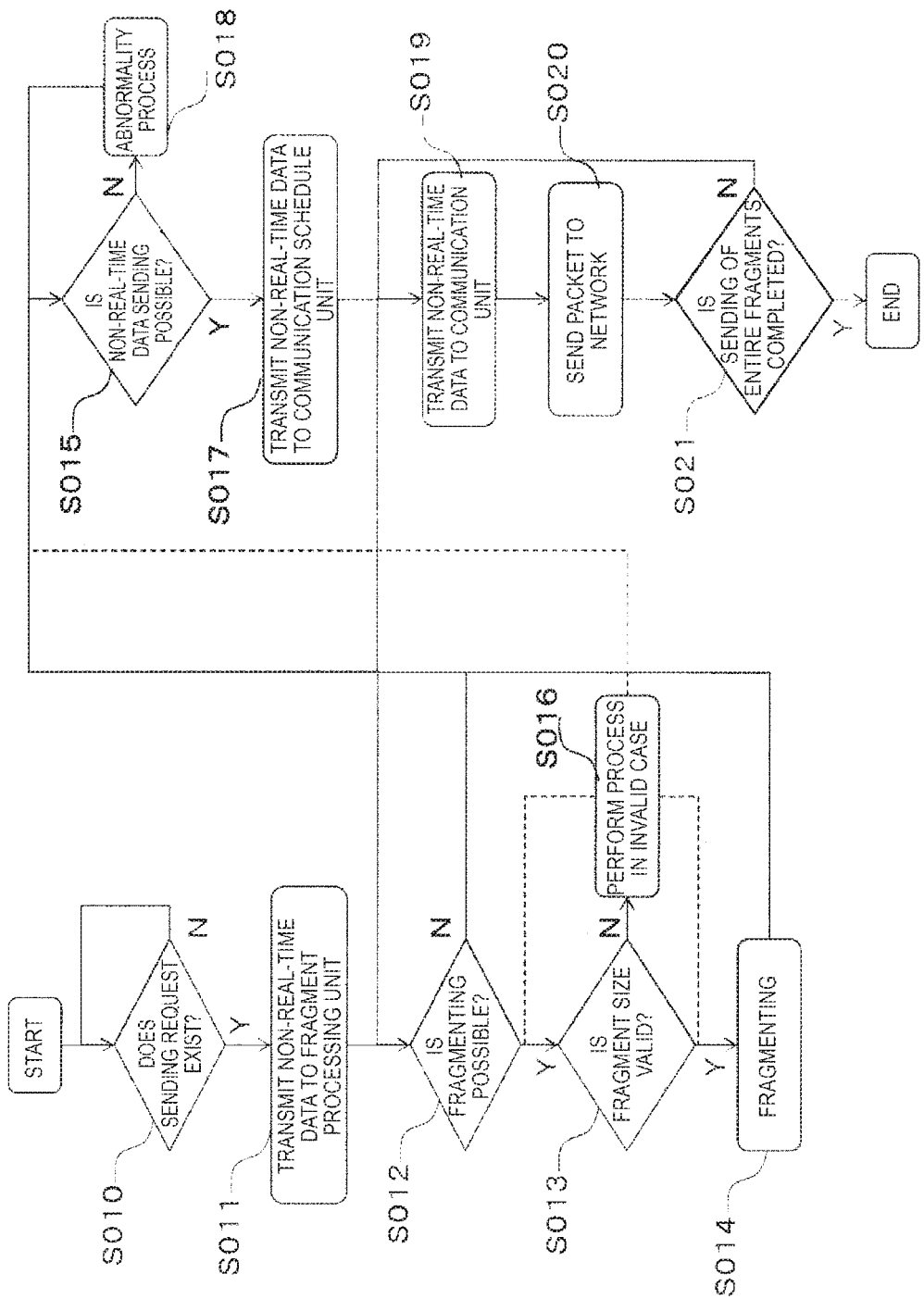
FIG. 6 is a flowchart illustrating an execution procedure in the embodiment of the present invention.

Subsequently, FIG. 6 illustrates a non-real-time data sending process.

First, the non-real-time communication unit 131 determines whether or not a non-real-time data sending process request exists (S010). There are cases in which the non-real-time data is sent from the communication control device 120 and is communicated form the communication device 124. In S010, if the sending request exists, the non-real-time data is transmitted to the fragment processing unit 135 (S011). If the sending request does not exist, a waiting process is performed. Subsequently, the fragment processing unit 135 determines whether or not it is possible to fragment the non-real-time data (S012). Determination of whether or not fragmenting is possible using information (a flag field of an IP header) on a packet may be exemplified. In step S012, if fragmenting is possible, it is determined whether or not the fragment size, which is notified from the dynamic fragment size determination unit 134, is valid (S013). In step S012, if fragmenting is not possible, the process proceeds to S015. In step S013, if the fragment size is valid, the non-real-time data is fragmented into the notified fragment size (S014). In step S013, if the fragment size is not valid, a predetermined process is performed (S016). Subsequent to step S016, according to the predetermined process, the process proceeds to any one of step S013 (in a case in which a predetermined process is waiting), step S014 (in a case in which the predetermined process is a process of fragmenting the non-real-time data by the predetermined size), and step S015 (in a case in which the predetermined process is a process of sending the non-real-time data without fragmenting). Subsequent to step S014, it is determined whether or not it is possible to send the non-real-time data (S015). The determination is performed based on whether or not a sending permission notification is provided from the communication schedule unit 136. If the sending is possible, the non-real-time data is transmitted to the communication schedule unit 136 (S017). If the sending is not possible, a predetermined error process is performed (S018), and the process is waiting. Subsequent to S017, the non-real-time data is transmitted to the communication unit 137 (S019).

Subsequent to S019, the communication unit 137 forms the non-real-time data by a packet format in conformity with the communication protocol of the network 122, and sends the non-real-time data to the network 122 (S020). Subsequent to S021, it is determined whether or not entire fragments are sent in a case in which fragmenting is performed (S021). If the entire fragments are sent, the process ends. If the fragments are not entirely sent, the process returns to step S012. In abnormality processes shown in steps S016 and S018, the elapse of predetermined time (timeout determination) and the execution of the determination process corresponding to a predetermined number of times or more are considered as abnormalities. Furthermore, stop of the non-real-time data sending process, destruction of the non-real-time data, a notification provided to the software which operates on the CPU 101 or each of the functional units, and execution of a predetermined notification method (network sending of alarm information to the communication device 124, output of an alarm sound, visual notification, such as an LED, or the like) which is provided in the communication control device 120 are exemplified.

Execution Procedure of Communication Schedule Unit 136

Figure 16:
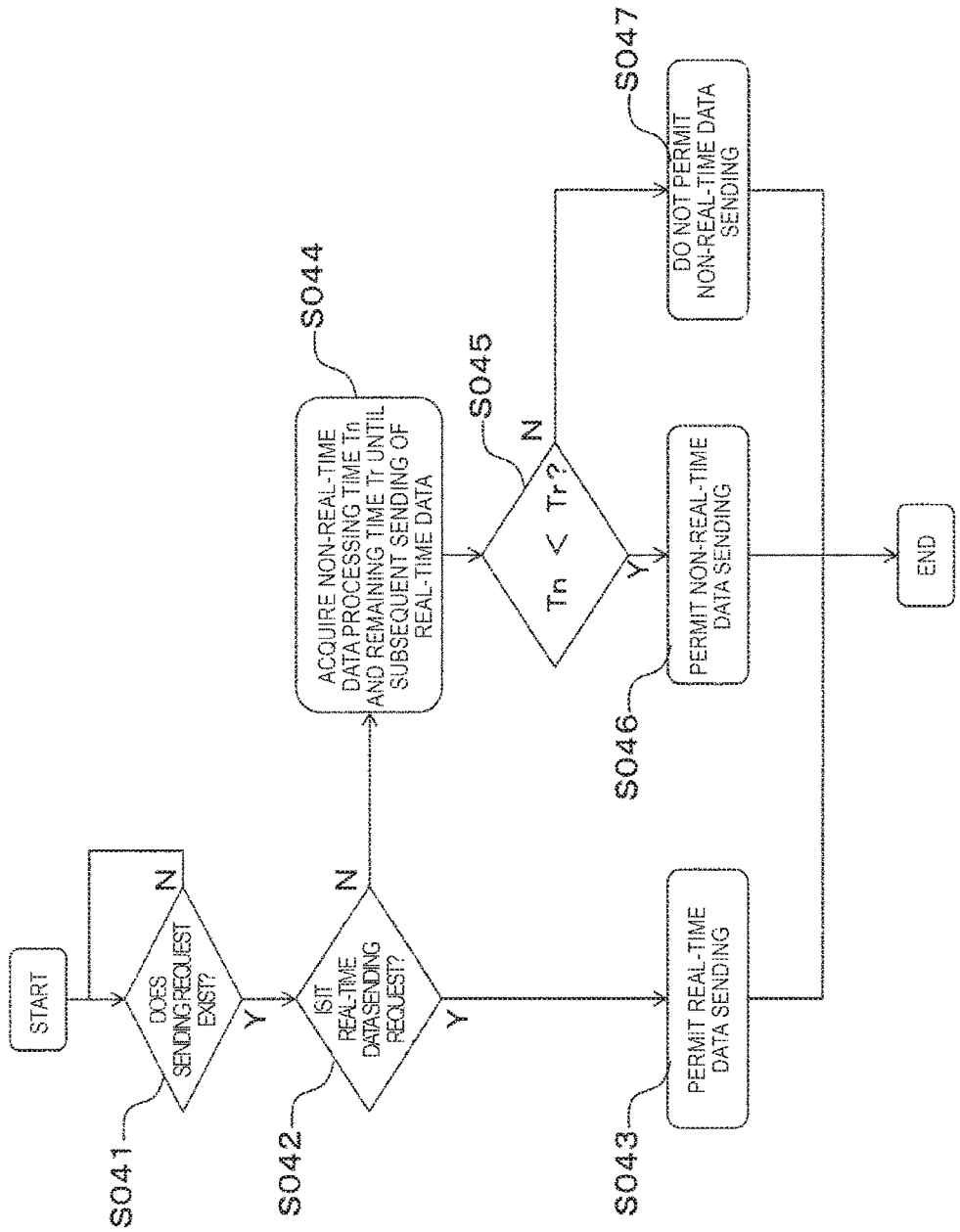
FIG. 16 is a flowchart illustrating an execution procedure in the embodiment of the present invention.

FIG. 16 illustrates an execution procedure of the communication schedule unit 136.

First, the communication schedule unit 136 waits until there is a sending request (S041). Furthermore, if there is a sending request, it is determined whether or not the sending request is a real-time data sending request (S042). If the sending request is the real-time data sending request, the sending request is permitted (S043).

In step S042, if the sending request is not the real-time data sending request, the sending request is a non-real-time data sending request. Therefore, the non-real-time data processing time Tn is calculated, and the remaining time Tr until the subsequent sending of the real-time data is acquired from the real-time communication status extraction unit 133 (S044).

Subsequently, the non-real-time data processing time Tn is compared with the remaining time Tr (S045). If the non-real-time data processing time Tn is short than the remaining time Tr, the non-real-time data sending request is permitted (S046).

In step S045, if the non-real-time data processing time Tn is equal to or longer than the remaining time Tr, the non-real-time data sending request is not permitted (S047). Subsequent to step S047, the sending of the non-real-time data is not possible until the sending of the subsequent real-time data is completed, and thus the procedures until step S047 are repeated. Thereafter, after the real-time data is sent (S043), the process proceeds to steps S041, S042, and S044, and the non-real-time data processing time Tn is compared with the remaining time Tr again in step S045. At this time, if the non-real-time data processing time Tn is shorter than the remaining time Tr, the non-real-time data sending request is permitted.

Destruction of Non-Real-Time Data

Meanwhile, at this time, in steps S045 and S047, the number of times in which the non-real-time data sending request is not permitted is counted, and the number of times may be notified to the non-real-time communication unit 131 in a case in which the counted number of times is equal to or greater than a predetermined number of times. Meanwhile, the number of times in which the sending is successively failed may be the reference of determination.

Based on the notification, the non-real-time communication unit 131 may destroy the sending data or may provide a notification to a component such as each of the functional units or a CPU 101.

Software on the CPU 101, which receives the notification, can take measures such as destruction of the non-real-time data, retransmission of the non-real-time data again, and extension of the sending cycle of the real-time communication unit 130.

Re-Execution of Fragment Process

In addition, according to a processing situation of the real-time data, there is a possibility that the fragment size is not fixed. Therefore, in a case in which the non-real-time data sending request is not permitted in step S045, it is possible to provide a notification that a fragment process should be performed again to the communication schedule unit 136. Therefore, the non-real-time data is fragmented again according to the fragment size, which changes according to the elapse of time and can be sent, and it is possible to determine whether or not the sending is possible by the communication schedule unit 136 again.

Add Packet Length to Head of Real-Time Data

Meanwhile, if the real-time communication unit 130 adds the packet length to the head of the real-time data, the real-time communication status extraction unit 133 extracts the entire length of the packet and provides a notification to the dynamic fragment size determination unit 134. With the above configuration, the dynamic fragment size determination unit 134 understands the entire length of the packet, and thus it is possible to calculate a real-time data process completion time before the real-time data process is completed. Therefore, the fragment processing unit 135 is notified of a scheduled process completion time, or a remaining time until the scheduled completion time and the fragment size in the scheduled time in advance, and thus the fragment processing unit 135 can start the fragment process before the scheduled real-time data sending process completion time by a time which is taken for the fragment process. Here, a case, in which the packet length of the real-time data head is removed by the real-time communication status extraction unit 133, the communication schedule unit 136, or the communication unit 137, is exemplified.

Case in which Real-Time Data Sending is Interfered

In addition, in a case in which a real-time data sending request is generated while the non-real-time data is being sent by the communication schedule unit 136 for some reasons, the sending of the non-real-time data may be continued without change. However, the sending of the non-real-time data may be stopped, and the real-time data may be forcibly sent. In this case, a case, in which cyclic redundancy check (CRC) of IEEE 802.3 is intentionally set to an abnormality value because the sending of the non-real-time data is stopped, is exemplified. If so, the packet is destroyed in the communication device 123 which received the packet. In addition, in order to retransmit the packet later, the sending data may be preserved inside while sending the non-real-time data. In this case, although the transmission of the non-real-time data to the communication unit 137 is stopped, the non-real-time data is continuously received by the fragment processing unit 135 and the entire non-real-time data is maintained.

If the sending of the non-real-time data is possible after the sending of the real-time data is completed, the non-real-time data is sent. In a case in which the sending of the non-real-time data is possible, the maintained non-real-time data is cleared. Meanwhile, in a case in which the retransmission of the non-real-time data is not possible even though the real-time data is sent for a predetermined period in the predetermined number of times, notifications that the sending of the non-real-time data is stopped and the retransmission of the non-real-time data is not possible, to the software which operates on the CPU 101, other functional units, or the outside may be exemplified. Meanwhile, the processes may be performed on the real-time data without being limited to the non-real-time data.

Detailed Example

Figure 7:
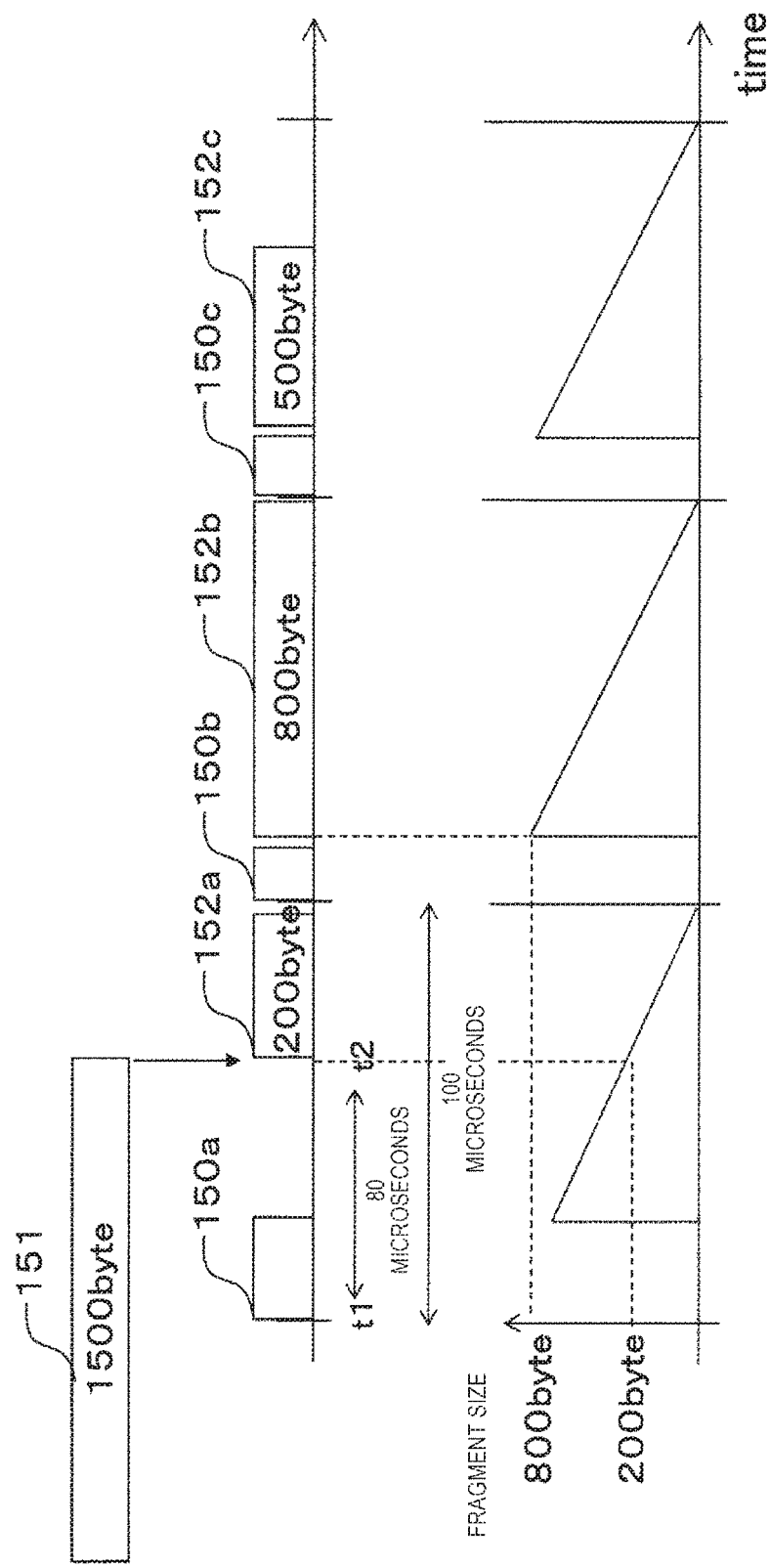
FIG. 7 is a diagram illustrating the packet sending process in the embodiment of the present invention.

FIG. 7 illustrates the status of a packet, which is output from the communication control device 120 to the network 122a on a time chart and which is illustrated in the procedure of FIGS. 5 and 6, and the fragment size acquired by the dynamic fragment size determination unit 134.

It is assumed that the sending cycle of the real-time communication unit 130 is 100 microseconds.

In time t1, the cycle elapses, the real-time data sending request is permitted, and the real-time data is sent. The non-real-time data is transmitted to the fragment processing unit 135 at a point of time t2. At this time, it is assumed that t2 is a point of time which elapses by 80 microseconds from t1 and the size of the non-real-time data is 1500 bytes.

If it is assumed that the processing performance of the non-real-time data is 50 Mbyte/sec, the processing time Ts of the non-real-time data for each unit data size of 1 byte becomes the sum of the processing time of the communication schedule unit 136 and the processing time of the communication unit 137 (IEEE 802.3 of 100 Mbps is assumed), and is acquired using the following equation.

$$Ts = 1 \text{ byte}/(50 \text{ Mbyte/sec}) + (1 \text{ byte}/(100 \text{ Mbps}/(8 \text{ bit/byte}))) = 100 \text{ nanosecond/byte}$$

The fragment size is acquired based on Equation 1.

$$Sf = (100 \text{ microseconds} - 80 \text{ microseconds})/(100 \text{ nanosecond/byte}) = 200 \text{ byte}$$

Therefore, the dynamic fragment size determination unit 134 provides a notification that the fragment size is 200 byte to the fragment processing unit 135. The fragment processing unit 135 shows an example in which non-real-time data 151 is fragmented into fragment packets 152a (200 byte), 152b (800 byte), 152c (500 byte) according to the fragment size which is notified from the dynamic fragment size determination unit 134.

Meanwhile, the sending data size of the real-time communication unit 130 may be not fixed. Therefore, even in a case in which the size of the non-real-time data is relatively large, the non-real-time data is fragmented by an appropriate size, and the communication schedule unit 136 determines a cycle in which the non-real-time data can be automatically sent, thereby enabling the non-real-time data to be sent.

Reception Process

Subsequently, a reception process will be described.

Figure 8:
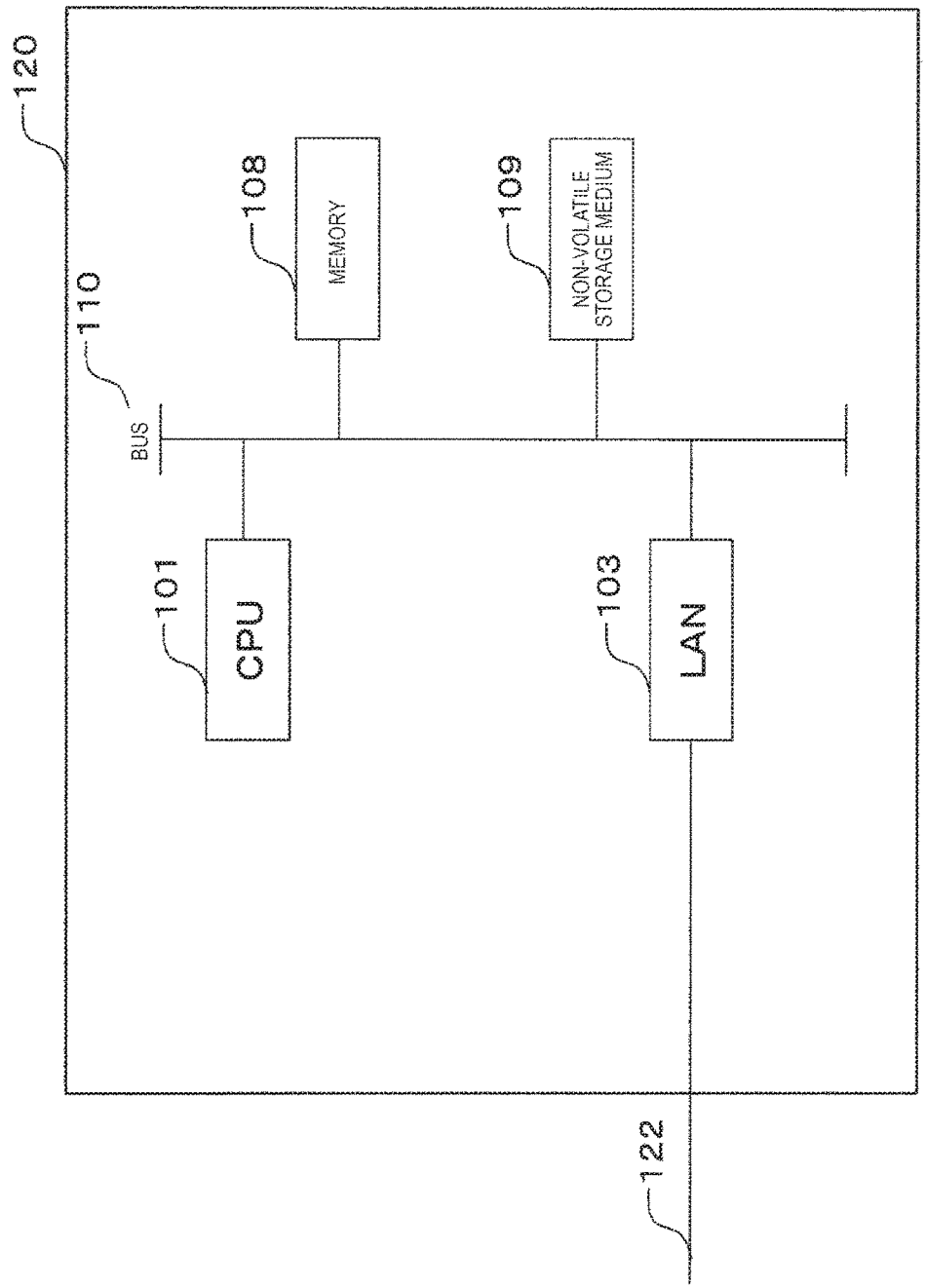
FIG. 8 is a hardware configuration diagram in the embodiment of the present invention.

FIG. 2 or FIG. 8 illustrates an example of hardware configuration in which the reception process is performed. FIG. 2 mainly assumes the communication control device 120, and FIG. 8 assumes the communication device 123.

Figure 9:
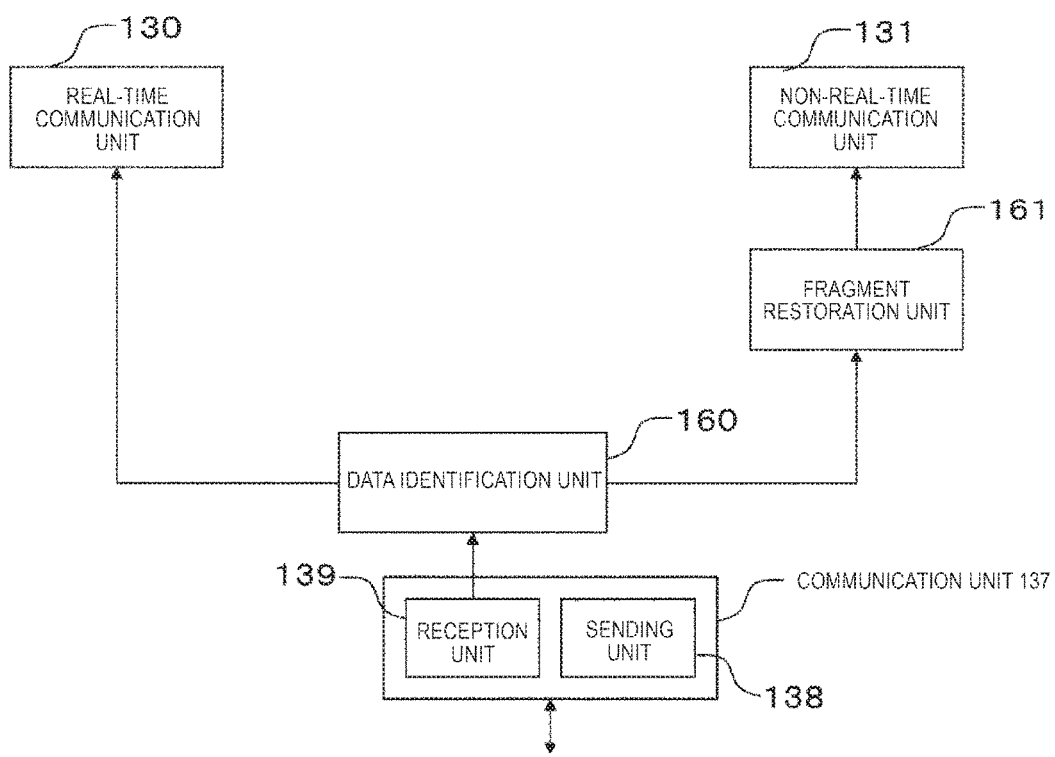
FIG. 9 is a functional configuration diagram illustrating the embodiment of the present invention.

FIG. 9 illustrates a functional configuration which performs the reception process.

A data identification unit 160 identifies whether the packet is the real-time data or the non-real-time data from the packet data. As an identification method, identification based on protocol information of the packet and identification using cycles in a reception interval and the existence/non-existence of a fragment header are exemplified. For example, a method of determining the real-time data or the non-real-time data in a case in which the type of the communication protocol and respective pieces of information (for example, a sending source IP address of IP, a destination communication port number of UDP, and the like) of the protocol header correspond to predetermined conditions, a method of determining the real-time data in a case in which periodicity exists in the reception interval of the packet which is identified as the protocol information, and a method of determining the non-real-time data in a case in which fragmenting is performed are exemplified.

The data identification unit 160 includes any one or more of the PHY 102, the LAN 103, the communication LSI 104, and the software which operates on the CPU 101.

If the data, which is received from the data identification unit 160, is fragmented, a fragment restoration unit 161 restores the fragment packet based on fragment information. If the data is not fragmented, the fragment restoration unit 161 transmits the non-real-time data to the non-real-time communication unit 131.

The fragment restoration unit 161 includes any one or more of the PHY 102, the LAN 103, the communication LSI 104, and the software which operates on the CPU 101.

Meanwhile, there is a case in which fragmenting is hierarchically performed through multi-stage. For example, there is a case of passing through a plurality of communication control devices 120. In such a case, one type of fragmenting process may be restored or a plurality of fragmenting processes may be restored. For example, a case in which the fragmenting process is performed until the added information attributable to the fragmenting disappears may be exemplified.

In addition, in a case in which the packet includes a plurality of lower components, the fragment restoration unit 161 may perform the restore process by checking the data area in the lower components.

Figure 10:
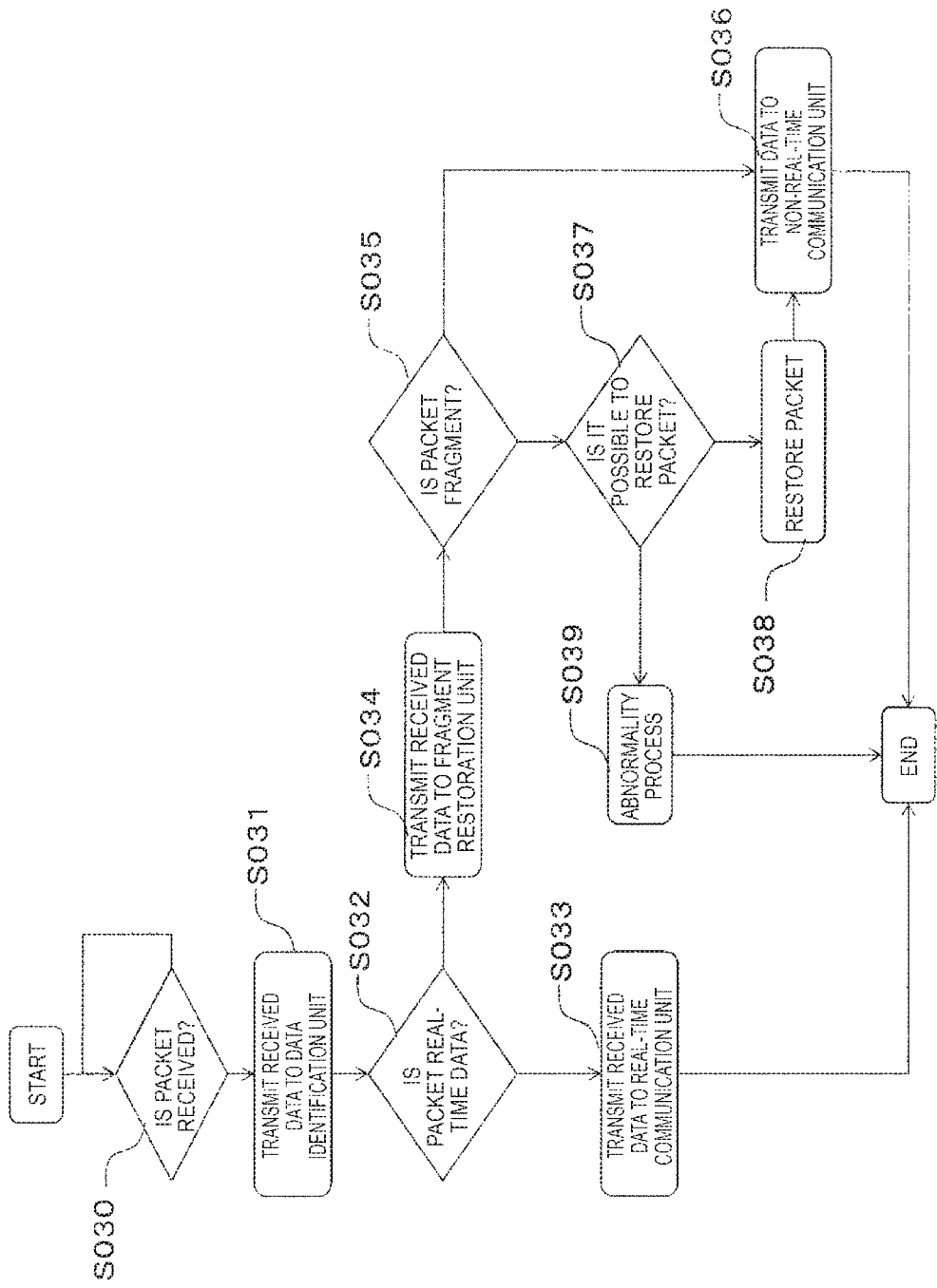
FIG. 10 is a flowchart illustrating an execution procedure in the embodiment of the present invention.

FIG. 10 illustrates a reception processing procedure.

First, it is determined whether or not a packet is received (S030). If the packet is received, the packet is transmitted to the data identification unit 160 (S031). Otherwise, a waiting process is performed. Subsequent to step S031, the data identification unit 160 identifies whether the packet is the real-time data or the non-real-time data (S032). If the packet is the real-time data, the reception data is transmitted to the real-time communication unit 130 (S033). In step S032, if the packet is not the real-time data, the reception data is transmitted to the fragment restoration unit 161 (S034). Meanwhile, in a case in which it is difficult to clearly identify either the non-real-time data or the real-time data in step S032, a case in which the reception data is transmitted to the fragment restoration unit 161 is exemplified. The reason for this is that a control command is important in a case of constructing a control system and it is assumed that the control command can be clearly identified (Meanwhile, in a case in which it is difficult to clearly identify either the non-real-time data or the real-time data, the reception data may be transmitted to the real-time communication unit 130).

Subsequent to step S033, the real-time communication unit 130 completes an application process (for example, instruction to an actuator) relevant to a control command, and ends a packet reception process. Subsequent to step S034, the fragment restoration unit 161 determines whether or not a received packet is fragmented (S035). If the received packet is fragmented, it is determined whether or not the whole fragmented packets are collected and it is possible to restore an original packet (S037). In step S037, if it is possible to restore the original packet, the packet is restored (S038) and is transmitted to the non-real-time communication unit 131 (S036). In step S035, the process proceeds to step S036 even in a case in which the received packet is not fragmented. Subsequent to S036, the non-real-time communication unit 131 completes an application process (for example, setting of a parameter) relevant to the control command, and ends the packet reception process. In step S037, if restoration is not possible, a predetermined abnormality process is performed (S039) and is ended. In the abnormality process in step S039, the elapse of predetermined time (timeout determination) and the execution of a determination process corresponding to the number of times which is equal to or greater than a predetermined number are considered as abnormalities. Furthermore, stop of a non-real-time data communication process, destruction of the non-real-time data, a notification provided to the software which operates on the CPU 101 or each of the functional units, and execution of a predetermined notification unit (sending of alarm information to the communication control device 120 and the communication device 124 through the network, output of an alarm sound, visual notification, such as an LED, or the like) which is provided in the communication control device 120 and the communication device 123 are exemplified.

Meanwhile, it is possible to perform steps subsequent to step S032 in parallel using a configuration of the digital IC (FPGA or CPLD), a multicore CPU, a multi-task, or the like.

Necessity and Unnecessity of Functional Unit

Here, in a case in which it is not necessary to transmit the packet from the communication device 124 in the functional configuration of FIG. 3, the delivery unit 140 and the communication unit 137b are not necessary.

Modification and Application

In the embodiment, the sending request and the data size are simultaneously notified from the real-time communication unit 130 and the non-real-time communication unit 131 to the communication schedule unit 136. However, the real-time communication unit 130 and the non-real-time communication unit 131 may respectively calculate the sending data processing time and may simultaneously notify the communication schedule unit 136 of the sending request and the sending data processing time.

In addition, in the embodiment, the real-time communication unit 130 and the non-real-time communication unit 131 are respectively provided one by one. However, the real-time communication unit 130 and the non-real-time communication unit 131 are respectively provided in plural. At that time, it is necessary to specify priority between the respective functional units.

In addition, in the embodiment, two communication subjects, that is, the real-time communication unit 130 and the non-real-time communication unit 131 are assumed, and description is performed while it is assumed that the priority of the real-time communication unit 130 is higher than the priority of the non-real-time communication unit 131. However, it is possible to assume a plurality of communication subjects by generalizing the priority. Here, a case, in which the communication subjects are classified into subjects that do not perform fragmenting and subjects that perform fragmenting and priority is set for each of the communication subjects, is exemplified. In the notification of the fragment size provided by the dynamic fragment size determination unit 134, the fragment size may be notified to the communication subjects that perform fragmenting according to the priority. In a case in which the fragment size is notified according to the priority, the existence of a communication subject to which a communication band is not allocated may be taken into consideration. Therefore, as the allocation of the communication band, a system of securing a minimum communication band and distributing a surplus band according to the priority, and a system of changing an assigned band and the priority for each cycle are exemplified. In addition, whether or not to apply fragmenting in each of the communication subjects may be dynamically changed.

Advantage

Advantages according to the above-described present invention will be described.

Even though a non-real-time data sending request is generated at an arbitrary timing, the dynamic fragment size determination unit 134 takes the remaining time until subsequent sending of real-time data into consideration and determines the fragment size, and the fragment processing unit 135 fragments the non-real-time data according to the size. In this manner, it is possible to send the real-time data at high accuracy without influencing on the sending of the non-real-time data. In addition, it is possible to improve the communication band of the non-real-time data by effectively using the gap of the real-time data sending time.

In addition, since the sending timing is automatically adjusted by the communication schedule unit 136, it is possible to request the sending time of the non-real-time data at an arbitrary timing from the software which operates on the CPU 101. Therefore, it is not necessary to sacrifice the development efficiency of an application which sets up the non-real-time data in order to maintain real-time data sending accuracy.

In addition, since it is not necessary to provide a non-real-time data sending time band on the network 122, it is easy to speed up the sending cycle and it is possible to improve control performance. In addition, even if setting is made such that the sending cycle is excessively short, a fact that the sending of the non-real-time data is not possible is detected, and thus it is possible to take a measure to adjust the sending cycle.

According to the embodiment as described above, it is possible to send the real-time data without being interfered by the sending, retransmission, and transmission of the non-real-time data.

Second Embodiment (Embodiment in Fixed Cycle+Non-Fixed Cycle+HSR)

A second embodiment of the present invention will be described. The second embodiment illustrates that a network, which includes the communication control device 120 and the communication device 123, is a ring-shaped redundant network, compared to the first embodiment. Reference symbols which are used in the embodiment indicate the same functions and components which are described in the first embodiment unless otherwise specifically noted.

Figure 11:
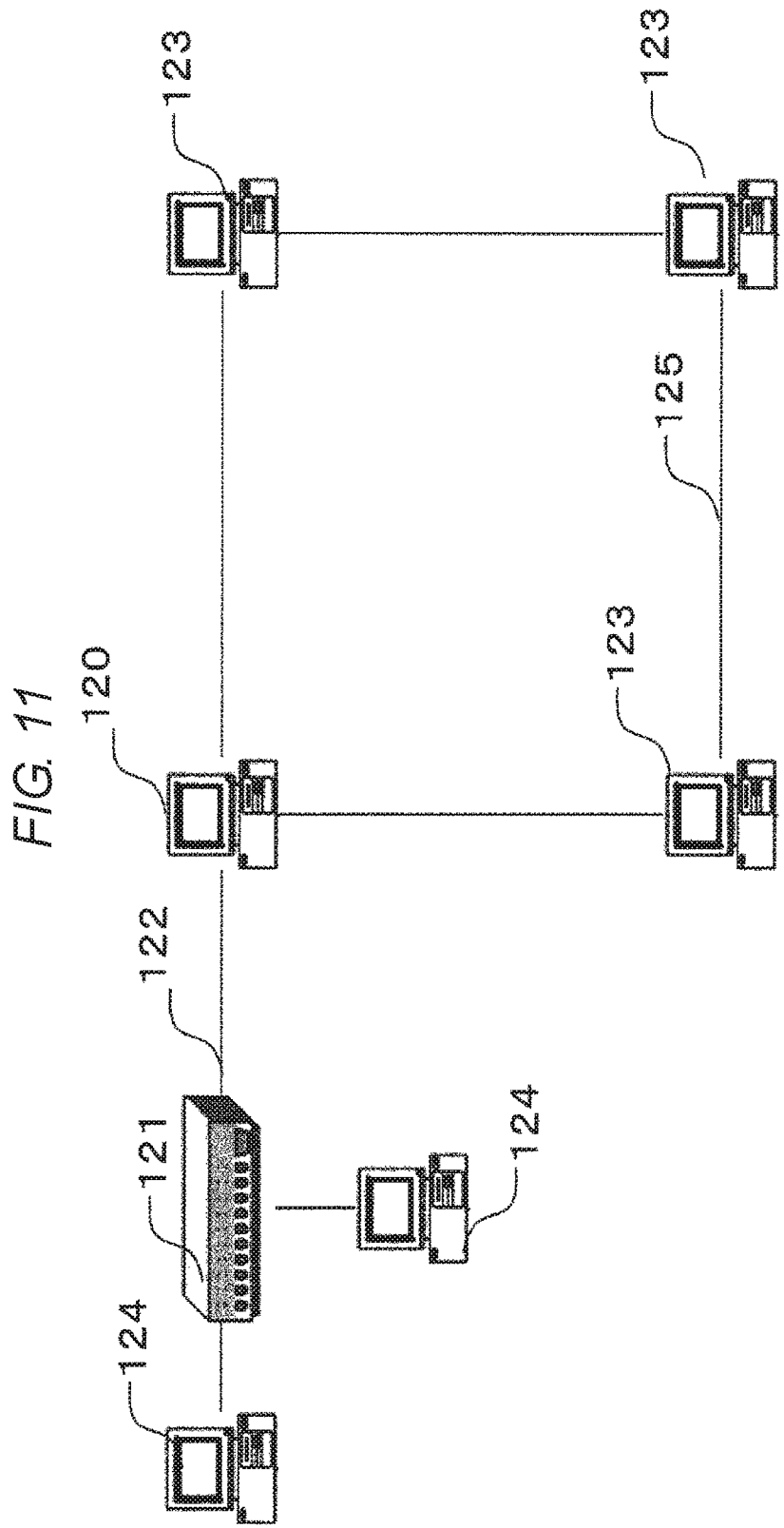
FIG. 11 is a configuration diagram illustrating a system using the embodiment of the present invention.

FIG. 11 illustrates an example of a system which is configured using the communication control device 120 to which the present invention is applied.

A network 125 indicates a ring network in which communication paths are redundant for high reliability. An implementation example will be described based on High Availability Seamless Redundancy (HSR) of IEC 62439-3.

In addition, description will be performed by separating the communication control device 120, the communication device 123, and the communication device 124. However, even though the communication device 123 and the communication device 124 include a function of the communication control device 120, the advantage of the present invention is not lost.

Description of Functional Unit

Figure 12:
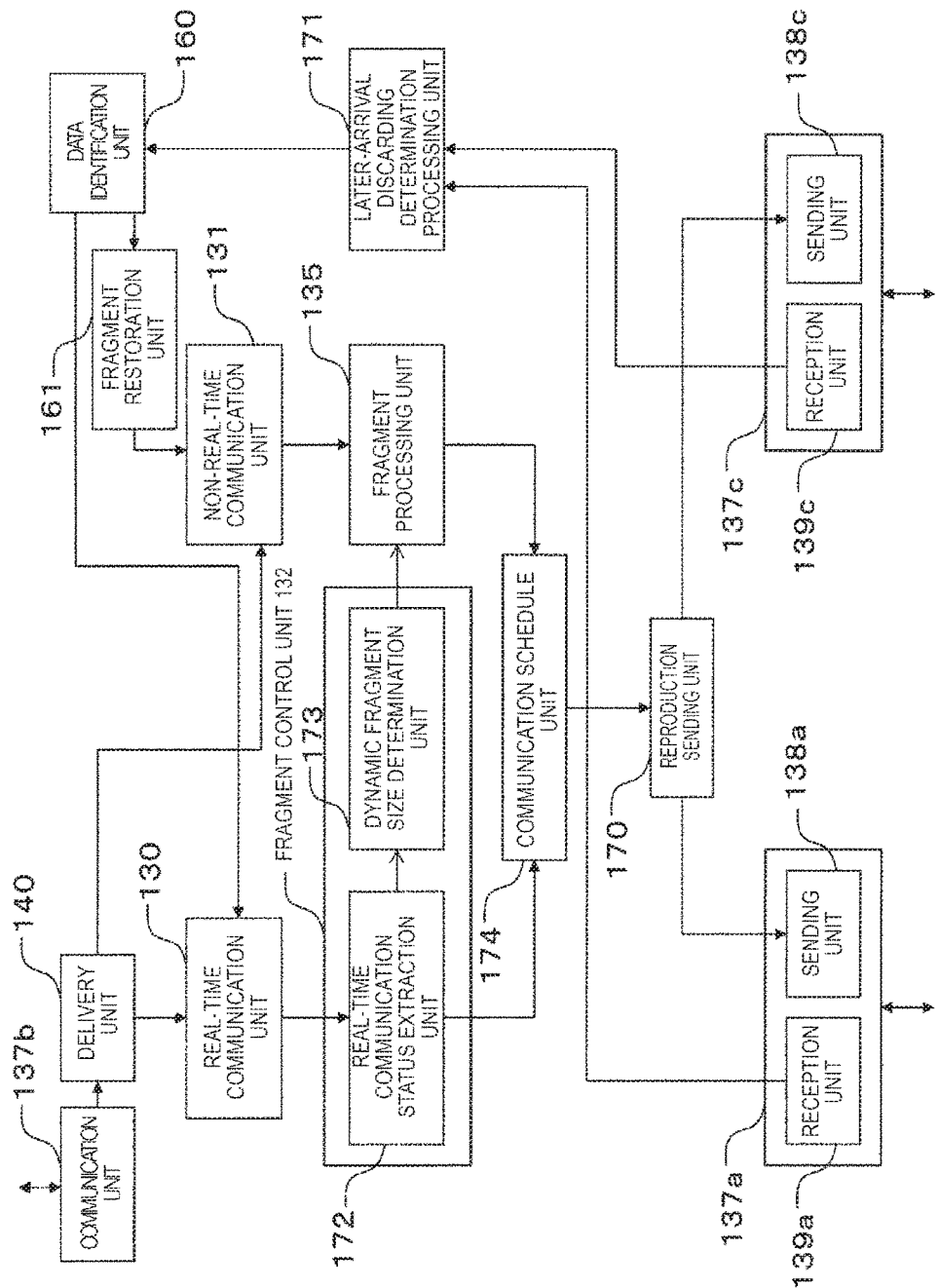
FIG. 12 is a functional configuration diagram illustrating the embodiment of the present invention.

FIG. 12 illustrates an embodiment of the functional configuration of the communication LSI 104 to which the present invention is applied.

Figure 13:
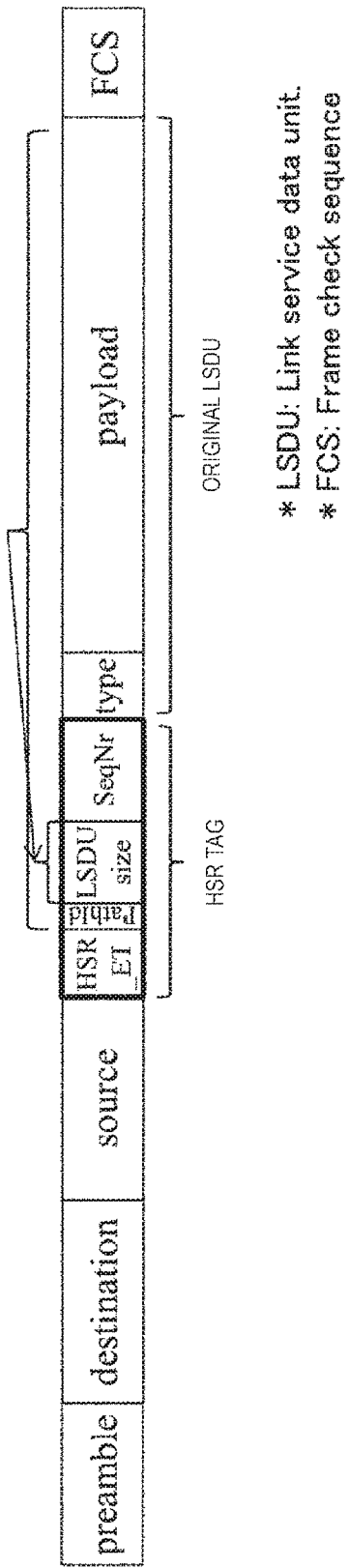
FIG. 13 is a diagram illustrating a packet format in the embodiment of the present invention.

A reproduction sending unit 170 adjusts data, which is transmitted from the communication schedule unit 136, into the frame format of the network 125, and sends the data. As an example, reproduction of the sending data and addition of an HSR tag are exemplified. FIG. 13 illustrates the HSR tag format.

A later-arrival discarding determination processing unit 171 performs a later-arrival discarding process of a received packet in conformity with IEC 62439-3 standards. In IEC 62439-3, the identity of reproduced reception data is determined based on information on the HSR tag, and first-arrival and later-arrival of the packets are determined. Packets which are determined to be later-arrival are discarded.

A real-time communication status extraction unit 172 notifies a dynamic fragment size determination unit 173 and a communication schedule unit 174 of a time slot (time zone), in which an HSR packet can be transmitted, from the real-time communication status of the HSR transmission packet which is determined to be real-time data, in addition to the function of the real-time communication status extraction unit 133.

The dynamic fragment size determination unit 173 determines the fragment size by taking the time slot for the HSR transmission packet into consideration based on the information which is notified from the real-time communication status extraction unit 172, in addition to the function of the dynamic fragment size determination unit 134.

The communication schedule unit 174 has functions of receiving time slot information for predetermined packet classification of the transmission packet or the like, and giving priority to the sending of the packet classification in the time zone, in addition to the function of the communication schedule unit 136.

Method of Determining Time Slot for HSR Packet Transmission

A method of determining a time slot for transmission in a cycle will be described with reference to FIG. 17. In a case in which it is assumed that nodes are synchronized, it is possible to determine a transmission packet reception timing in the communication control device 120 based on a time (T1 in FIG. 17) from a cycle start time in the communication control device 120 to a sending timing of the communication device 123 and the communication delay between the communication device 123 and the communication control device. Since the communication delay is a redundant network, two T2 and T3 of FIG. 17 exist.

It is possible to acquire T2 by the following equation.

$$T2 = Ld \times N + Ttr \times (N-1) \quad \text{(Equation 7)}$$

Here, Ld is the communication delay on a path between the communication devices 123, N is the number of hops to the communication control device 120, and Ttr is the communication delay in each of the communication devices 123. Similarly, in a case of T3, N becomes different due to difference between two redundant paths (left-side rotation and right-side rotation). Although Ld is set to the same value, Ld may be a different value for each path according to the path length or the performance of communication medium (in this case, being reflected in Equation 7). In addition, Ttr may be a value which differs according to the communication device 123 on the path.

Therefore, transmission packet reception timing in the communication control device 120 is acquired by the following equation.

$$Ta = T1 + T2 \quad \text{(Equation 8)}$$

$$Tb = T1 + T3 \quad \text{(Equation 9)}$$

Figure 17:
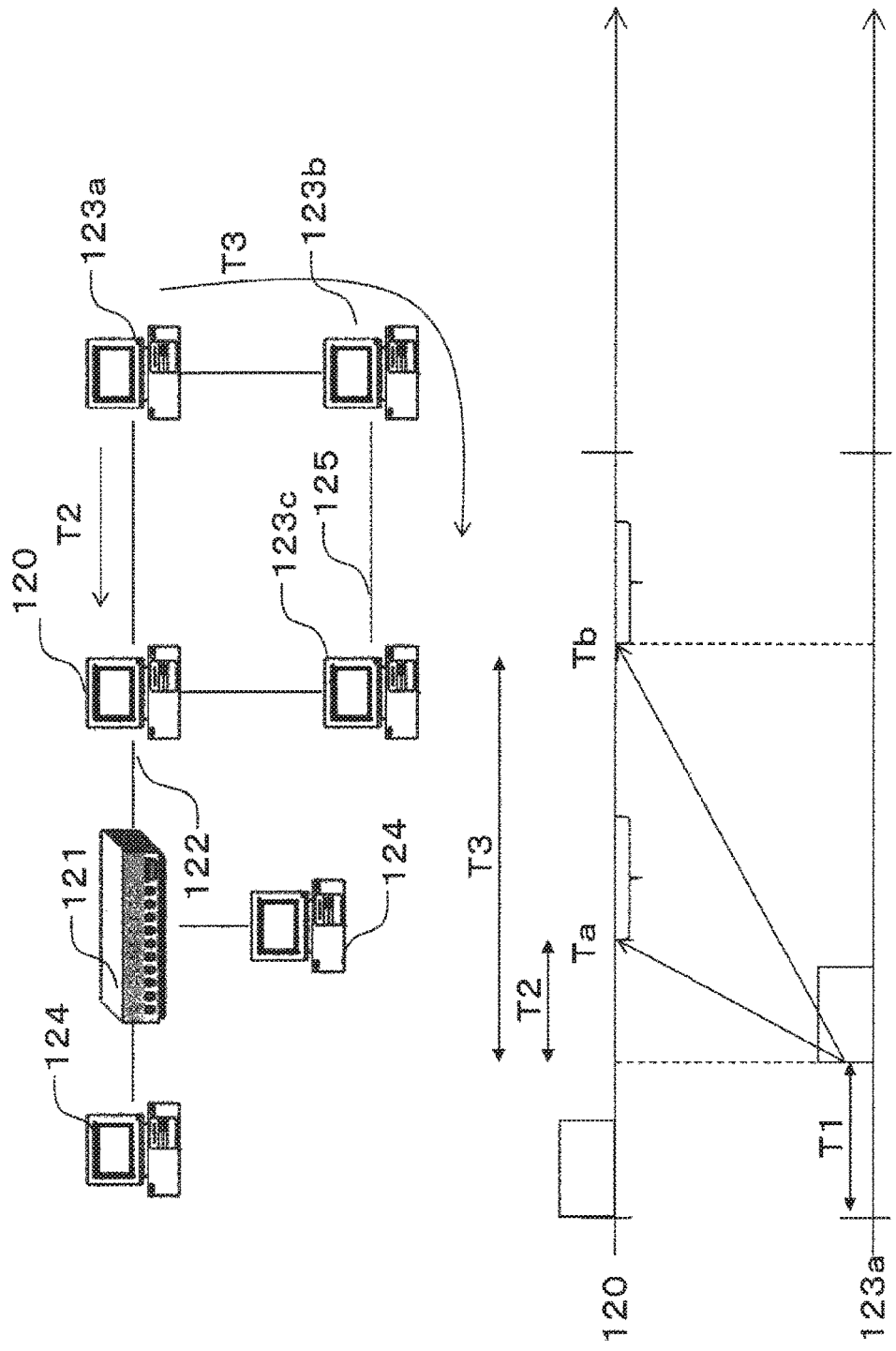
FIG. 17 is a diagram illustrating a method of determining a time slot in the embodiment of the present invention.

Here, Ta is left-side rotation transmission packet reception timing of FIG. 17, and Tb is right-side rotation transmission packet reception timing of FIG. 17.

It is assumed that Ta and Tb are timing in which the transmission packet arrives, and the dynamic fragment size determination unit 173 determines the fragment size based on remaining time until Ta and Tb. Meanwhile, although Ta is faster time than Tb in FIG. 17, Tb may be faster than Ta due to difference in respective numerical values included in Equation 7, as described above.

In order to acquire respective pieces of information which are necessary for calculating Ta and Tb, the communication control device 120 may be configured to include a predetermined input unit or to be notified of the respective pieces of information from the respective communication devices 123.

Meanwhile, the length of the time slot continues until a process of the transmission packet is completed. In a case of the HSR packet, if an HSR tag in a predetermined location of the head is read, the entire length of the packet is understood, as illustrated in FIG. 13. Therefore, it is possible to calculate transmission process completion time before a transmission packet process is completed. Therefore, if the fragment sizes in scheduled transmission process completion time or the remaining time until the scheduled completion time and scheduled time are notified to the fragment processing unit 135 in advance, the fragment processing unit 135 can start the fragment process in advance from the scheduled transmission process completion time by time which is taken for the fragment process.

In addition, since the later-arrival discarding process is performed on the HSR packet by the communication device 123 which receives the same packet, a case, in which, at a point of time that the transmission of one-side transmission packet is completed, reservation of a transmission packet time slot from another direction is cancelled, is exemplified. For example, FIG. 17 illustrates a process of cancelling the time slot from Tb after the transmission packet is processed in the time zone Ta. In this manner, it is possible to increase time in which the non-real-time data can be communicated.

In addition, the transmission packet time slot of one communication device 123 may be reserved in a cycle or transmission packet time slots of a plurality of communication devices 123 may be reserved. In a former case, a case in which the communication device 123, which reserves the time slot, is changed for each cycle is exemplified. Furthermore, in a case in which the transmission packet time slots of the plurality of communication devices 123 are reserved within the same cycle, and in a case in which the time slots are superimposed or one-side transmission process is delayed because transmission packet reception timings are actually superimposed, a notification may be provided to the software which operates on the CPU 101 or the outside of the communication control device 120 by a predetermined notification unit, or a case in which the sending timing (T1 in FIG. 17) is changed in the communication device 123 by providing a notification to a target communication device 123 is exemplified.

Otherwise, even though a communication target is one communication device 123, a plurality of time slots may be assigned in a case in which it is possible to distinguish the real-time data from non-real-time data by the transmission packet. In this case, the numerical values of T1, T2, and T3 in the calculation of Equations 8 and 9 are different.

In addition, a transmission time slot start time may be adjusted by a margin. The reason for this is that fluctuation is generated in the transmission time within each communication device 123. Here, a case, in which the margin of the transmission time slot start time for a communication device 123 in which the number of hops is close is reduced, is exemplified. The reason for this is that it is conceivable that the fluctuation in the communication delay is reduced as the number of passing-though hops becomes small.

Figure 14:
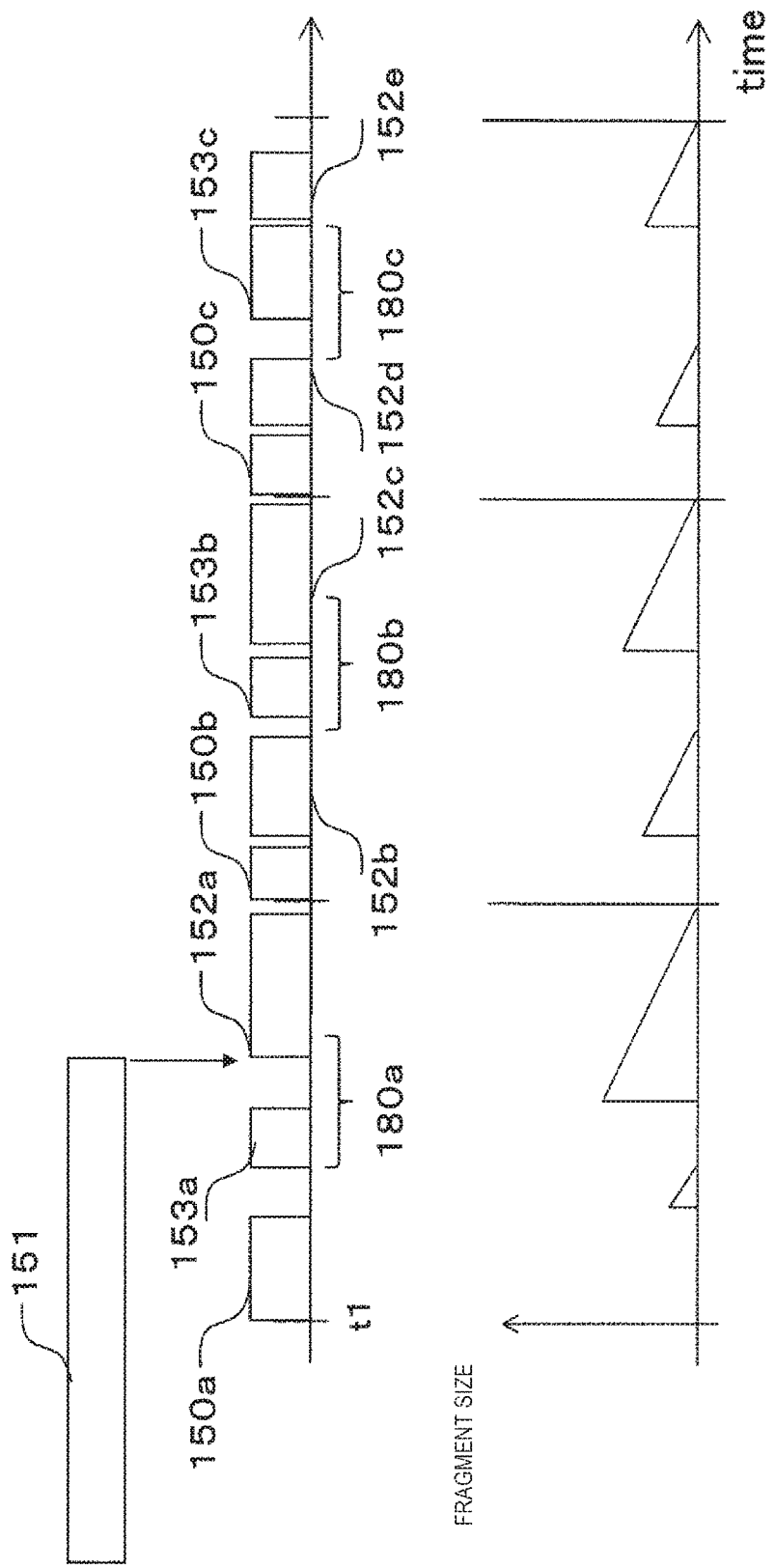
FIG. 14 is a diagram illustrating a method of determining a fragment size in the embodiment of the present invention.

Method of Determining Fragment Size of Dynamic Fragment Size Determination Unit 173 FIG. 14 illustrates fragment sizes determined by the dynamic fragment size determination unit 173.

In FIG. 14, an HSR packet transmission time slot 180 is reserved in addition to FIG. 11. If the configuration of the network 125 and the sending timing of each node are determined, arrival time zone of the transmission packet in other nodes is designed in advance. The dynamic fragment size determination unit 173 determines the fragment size by taking remaining time until HSR packet transmission time slot into consideration in addition to remaining time until subsequent sending time of the real-time data. That is, the fragment size is determined by setting the remaining time Tr until subsequent sending time of the real-time data in Equation 1 to the remaining time until HSR packet transmission. The meaning of Tr becomes different depending on the time zone in the cycle, that is, Tr may be time until subsequent sending of the real-time data or time until HSR packet transmission time slot.

Meanwhile, the fragment restoration unit 161 may combine some fragment groups. For example, in a case in which the sizes of received fragments are equal to or less than a defined value or in a case in which reception sizes per unit time are equal to or less than the defined value, the fragments are maintained, and then the received fragments are combined. In this manner, if not only the packet is simply fragmented and subdivided but also a plurality of fragments are combined and the packet size increases, and the number of packets is reduced according to a communication situation, it is possible to improve the efficiency of utilization of the communication band.

Control of Priority in Real-Time Communication Unit 130 and Non-Real-Time Communication Unit 131

The real-time communication unit 130 and the non-real-time communication unit 131 preform reception of the HSR transmission packet in addition to the sending from themselves and communication from the communication device 124. It is necessary to determine the order of the sending of respective packets in the real-time communication unit 130 and the non-real-time communication unit 131. As a method of defining such an order, a method of sending packets in order of arrival, a method of determining priority, and a method of prohibiting other sending before predetermined time such that interference does not occur in a case in which timing in which a sending request is generated is already known, may be exemplified.

Figure 15:
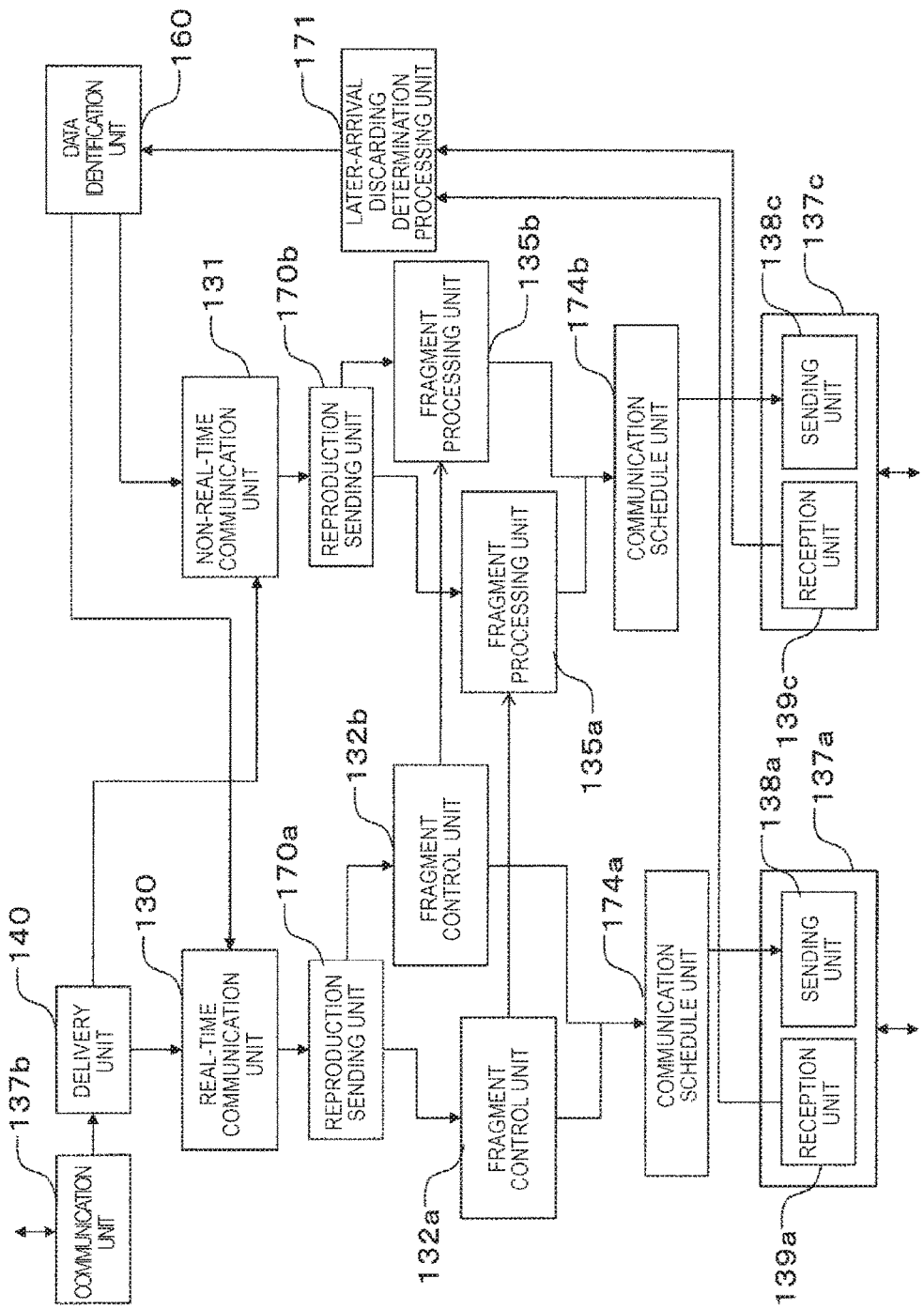
FIG. 15 is a functional configuration diagram illustrating the embodiment of the present invention.

Meanwhile, FIG. 15 illustrates the functional configuration of the communication control device 120. Unlike FIG. 12, after packet reproduction is performed by the reproduction sending unit 170, the real-time data and the non-real-time data are transmitted to the communication schedule unit 174 through the fragment control unit 132 and the fragment processing unit 135. Meanwhile, an HSR tag replacement process performed by the communication schedule unit 174 is necessary after fragmenting.

In addition, in a case in which it is not possible to transmit the HSR transmission packet within a time slot which is assigned in FIG. 14, interference in the control command may be considered, and thus a case in which the packet is discarded is exemplified. In this case, a notification may be provided to the software which operates on the CPU 101 or to the outside.

In addition, in a case in which a real-time data sending request is generated in the communication schedule unit 174 while sending the transmission packet for some reason, the sending of the transmission packet may be continued without change, and the sending is stopped on the way and the real-time data may be forcibly sent. In this case, in order to stop the sending of the transmission packet, a case in which CRC of IEEE 802.3 is intentionally set to an abnormality value is exemplified. In addition, in order to subsequently perform retransmission, a case in which a sending data maintaining function, a retransmission function, and a notification function in the communication schedule unit 174 are used may be exemplified.

Meanwhile, the function of the communication control device 120 may include RedBox defined in IEC 62439-3.

In addition, the network 125 may conform to Parallel Redundancy Protocol (PRP) of IEC 62439-3.

Advantages

Advantages according to the above-described present invention will be described.

Even though a non-real-time data sending request or the transmission is generated at an arbitrary timing, the communication schedule unit 174 determines whether or not to permit the sending request by comparing the non-real-time data processing time or the transmission data processing time with the remaining time until subsequent sending of the real-time data. In this manner, it is possible to accurately perform the sending of the real-time data without being influenced by the sending and transmission of the non-real-time data. In addition, it is possible to improve the communication band of the non-real-time data by effectively using the gap between the real-time data sending time and sending time of transmission.

Furthermore, since it is possible to transmit the real-time data in a range in which the accuracy of the sending of the real-time data is maintained, it is possible to acquire the advantage of the reliability attributable to the redundant network which includes the communication control device 120 and the communication device 123, and thus it is possible to realize high reliability and high performance of the control system.

Furthermore, if setting is made such that the priority of transmission is higher than the priority of the sending of the non-real-time data, it is possible to perform transmission without being influenced by the sending of the non-real-time data, and thus it is possible to enhance an advantage attributable to the transmission.

Third Embodiment (Embodiment in Fixed Cycle+Non-Fixed Cycle+Retransmission)

A third embodiment of the present invention will be described. The third embodiment in the present invention is an embodiment in which a real-time data retransmission function is provided and the data communicability of the sending of the real-time data is improved, compared to the first embodiment and the second embodiment. Reference symbols which are used in the embodiment indicate the same functions and components which are described in the first embodiment and the second embodiment unless otherwise specifically noted.

An example of a system, to which the present invention is applied and which is formed using the communication control device 120, is the same as in FIGS. 1 and 11.

Description of Functional Unit

Figure 18:
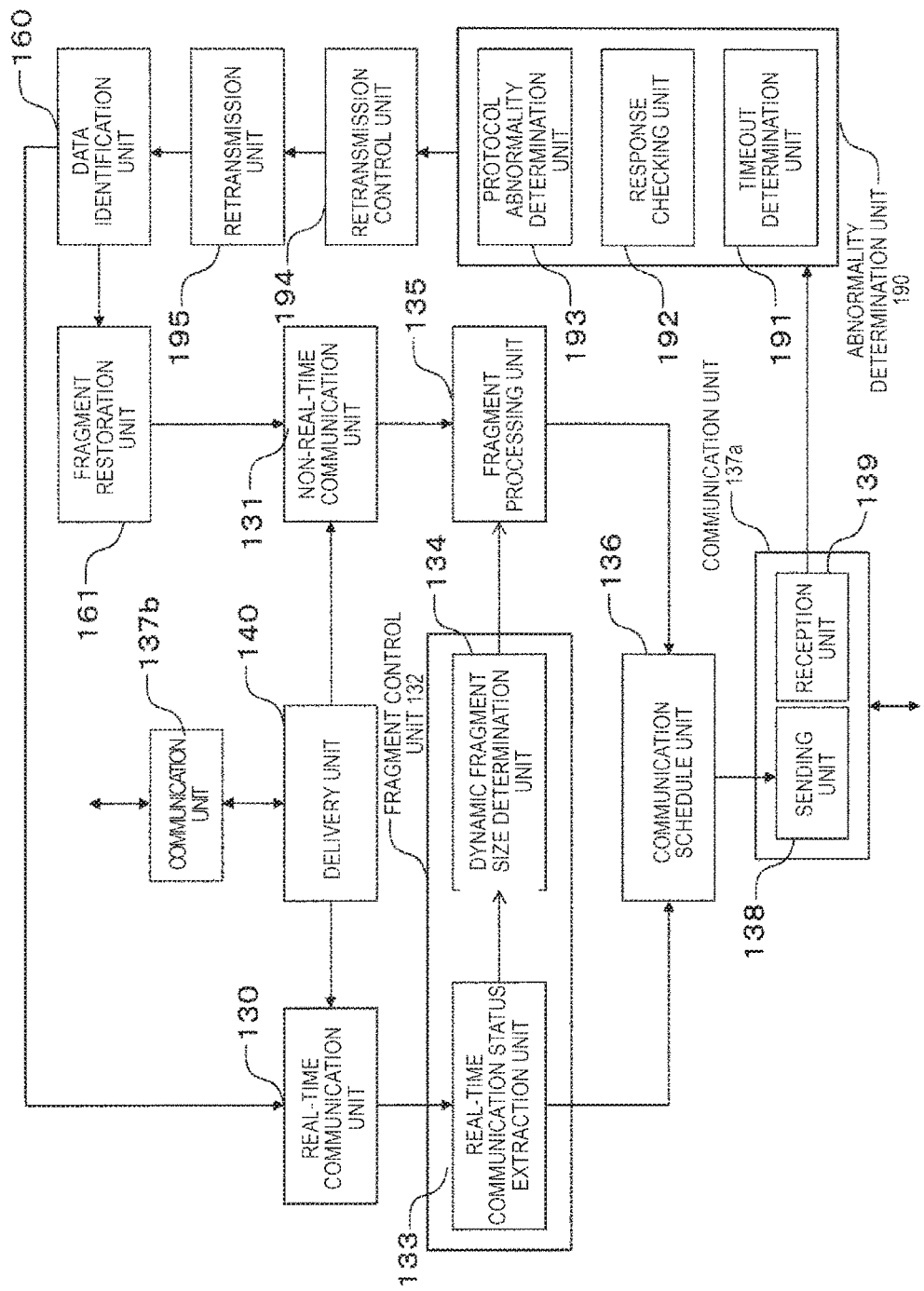
FIG. 18 is a functional configuration diagram illustrating the embodiment of the present invention.
Figure 19:
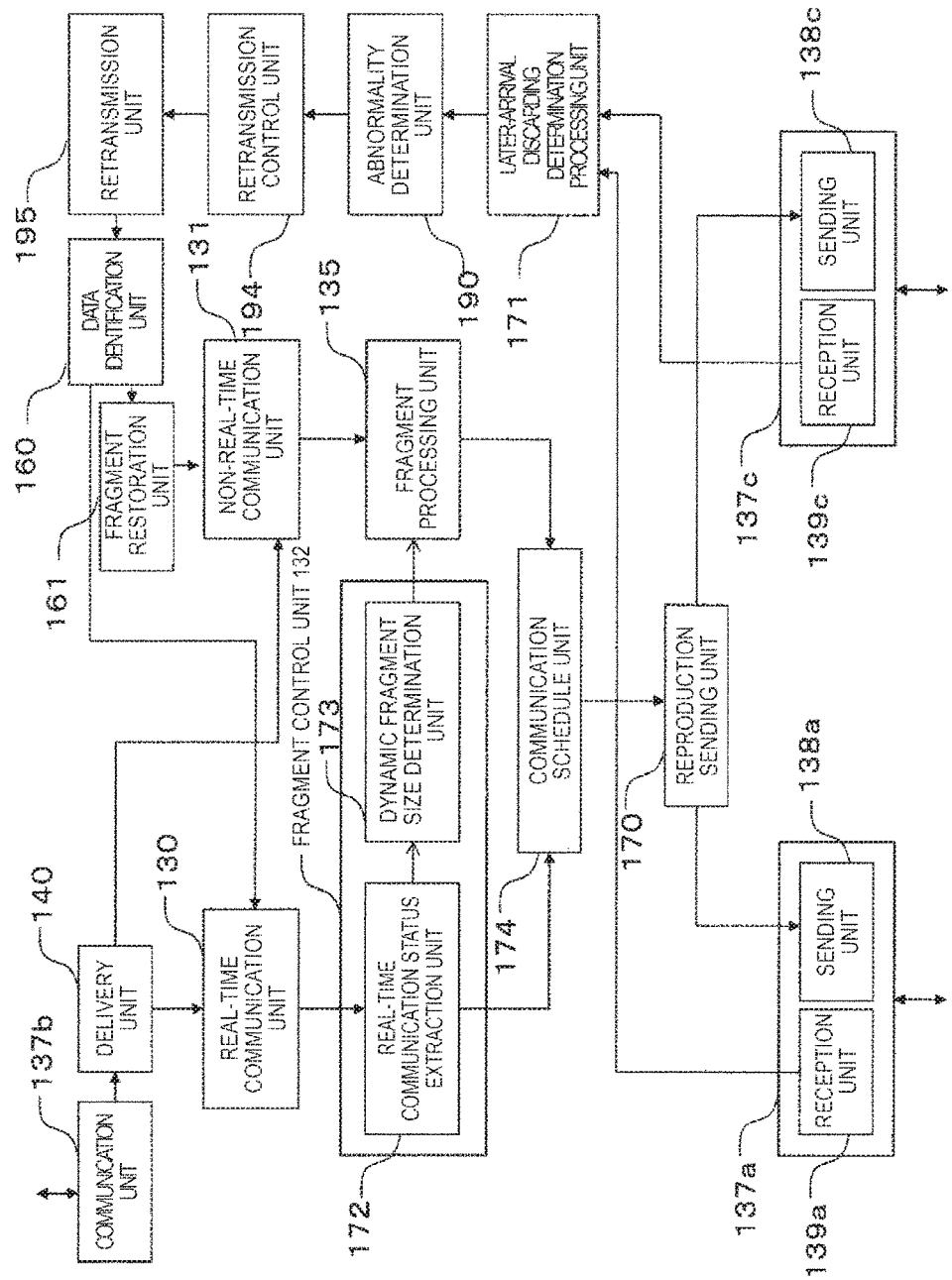
FIG. 19 is a functional configuration diagram illustrating the embodiment of the present invention.

FIGS. 18 and 19 illustrate an embodiment of the functional configuration of the communication LSI 104 to which the present invention is applied. FIG. 18 illustrates a functional configuration in a case of being applied to the example of the system of FIG. 1, and FIG. 19 illustrates a functional configuration in a case of including the communication function of the redundant network in FIG. 11.

An abnormality determination unit 190 is a functional unit which determines the success or failure of the sending of the real-time data performed by the real-time communication unit 130 based on the content of reception data which is received from the reception unit 139 or the elapse of time. The abnormality determination unit 190 notifies the retransmission control unit 194 of the result of the determination.

A timeout determination unit 191 monitors the elapse of time from when the real-time communication unit 130 starts the sending of the real-time data, and determines whether or not predetermined time elapses. In a case in which success of communication of the real-time data within the predetermined time is detected by the abnormality determination unit 190, the timeout determination unit 191 stops monitoring the elapse of time and determines that the real-time data is received in time.

A response checking unit 192 determines whether or not the sending of the real-time data is successful based on a replay from the communication device 123 which received the real-time data from the communication control device 120. In a case in which the communication device 123 properly receives the real-time data, the communication device 123 sends an acknowledgment referred to as ACK to the communication control device 120. Otherwise, in a case in which the communication device 123 could not properly receive the real-time data from the communication control device 120, the communication device 123 sends a negative acknowledgment referred to as NACK to the communication control device 120. In a case in which the response checking unit 192 receives ACK, the response checking unit 192 determines that the sending of the real-time data is successful. In a case in which the response checking unit 192 receives NACK, the response checking unit 192 determines that the sending of the real-time data is failed.

A protocol abnormality determination unit 193 provides an abnormality determination unit in conformity with the communication protocol. For example, in a case in which data on the reception packet is a value or configuration against the communication protocol or in a case of conditions in which it is possible to determine that the communication is successful or failed on the communication protocol, the protocol abnormality determination unit 193 determines the result of communication. For example, in a case of IEEE 802.3, it may be determined that the communication of the real-time data is not properly performed based on CRC abnormality of a reception frame, the abnormality of the packet format, or the like. In addition, in CPF 12 of IEC 61784-2, it is possible to determine whether or not the sending of the real-time data is properly processed in the communication device 123 based on whether or not a predetermined counter on the frame is equal to an expected value. The counter is a field on a packet which is counted up by a predetermined number by the communication device 123 whenever a process is properly performed in the communication device 123 which should process the sending data. Meanwhile, the protocol abnormality determination unit 193 includes a unit which previously sets the expected value.

A retransmission control unit 194 is a function unit that receives the result of determination of the abnormality determination unit 190, and requests retransmission to the retransmission unit 195 or requests erasing of the sending data which is preserved in the retransmission unit 195.

The retransmission unit 195 receives the sending data in a case in which the real-time communication unit 130 transmits the sending data to the communication schedule unit 174, and preserves the sending data inside. In a case in which a retransmission request exists from the retransmission control unit 194, retransmission to the communication schedule unit 174 is requested.

Meanwhile, in a case in which the sending data of the real-time communication unit 130 is preserved inside or in a case in which retransmission is permitted from the communication schedule unit 174 and the sending data is output, the sending data may be changed in order to indicate retransmission. As a detailed method, a method of defining an area indicative of retransmission in the sending data or header, and defining a parameter indicative of retransmission is exemplified. In addition, whether or not fragmenting is possible is changed, and, for example, setting may be made such that fragmenting is not possible.

In addition, the elapse of the sending cycle is notified from the real-time communication unit 130, and internal sending data may be erased. A case in which the erasing is performed using a system in which retransmission is necessary within the cycle is exemplified.

In addition, a function corresponding to the retransmission unit 195 may be provided in the real-time communication unit 130.

Configuration of Abnormality Determination Unit and Network System

The abnormality determination unit 190 is formed by a combination of one or more of the timeout determination unit 191, the response checking unit 192, and the protocol abnormality determination unit 193. As a system of integrating the results of determination of the respective functional units of the timeout determination unit 191, the response checking unit 192, and the protocol abnormality determination unit 193, priority may be given to the results of the determination of the respective functional units (for example, priority is given to the result of the determination of the protocol abnormality determination unit 193 over other results of determination of the timeout determination unit 191 and the response checking unit 192), and the results of determination of the respective functional units may be formed by predetermined logical expressions.

Meanwhile, the aptitudes of the configurations of the timeout determination unit 191, the response checking unit 192, and the protocol abnormality determination unit 193 in the abnormality determination unit 190 are different from each other according to a network system.

For example, in CPF 12 of IEC 61784-2, a communication frame, which is sent from the communication control device 120, is characterized to sequentially pass through each of the communication device 123 and return to the communication control device 120 after passing through the whole communication device 123. With the characteristic, a method of checking a counter value on the packet by the retransmission control unit 194 may be used, and the protocol abnormality determination unit 193 may be used. In addition, there is a possibility that the packet is lost on the network, and thus it is preferable to apply the timeout determination unit 191.

In contrast, in a case in which a replay from the communication device 123 to the communication control device 120 is not necessarily defined on the specifications of the network 122 and the network 125, a configuration, which is made such that an acknowledgment or negative acknowledgment is explicitly replied from the communication device 123 using the timeout determination unit 191 and the response checking unit 192, is exemplified.

Assignment of Time Slot

A method of assigning a time slot in the transmission packet of FIG. 17 is exemplified for retransmission. A retransmission time slot start timing Tc (corresponding to Ta in Equation 8 and Tb in Equation 9) is acquired by the following equation.

$$Tc = To \qquad \text{(Equation 10)}$$

Here, To is timeout, and the use of the timeout determination unit 191 is assumed. The real-time communication status extraction unit 172 notifies the dynamic fragment size determination unit 173 of a timeout value, the dynamic fragment size determination unit 173 determines the fragment size from the remaining time until the retransmission time slot Tc determined based on the timeout, and notifies the fragment processing unit 135 of the fragment size.

Meanwhile, in a case in which the sending of the real-time data is proper checked by the abnormality determination unit 190, the assignment of the retransmission time slot is canceled, and thus it is possible to assign a band for the sending of the non-real-time data.

In addition, the retransmission time slot may be assigned on a cycle separate from the cycle in which the real-time data is sent according to the configuration of the network. For example, a case in which response delay for the sending of the real-time data is longer than the cycle is illustrated.

Meanwhile, abnormality determination performed by the abnormality determination unit 190 may be performed on the non-real-time data in addition to the real-time data. The retransmission control unit 194 and the retransmission unit 195 may control a retransmission process for the communication of the non-real-time data in the same manner.

In addition, the retransmission data may be treated as the non-real-time data instead of the real-time data. This is realized by notifying the retransmission packet or the retransmission request to the non-real-time communication unit 131, for example, in a case in which data indicative of retransmission on the packet is checked by the data identification unit 160.

In addition, priority may be given between the sending data and the retransmission data in the real-time communication unit 130 or the non-real-time communication unit 131.

In addition, in a case in which a real-time data sending request is generated in the communication schedule unit 174 while the retransmission packet is being sent for some reason, the sending of the retransmission packet may be continued without change, and the sending is stopped on the way and the real-time data may be forcibly sent. In this case, in order to stop the sending of the retransmission packet, a case in which CRC of IEEE 802.3 is intentionally set to an abnormality value is exemplified. In addition, in order to subsequently perform retransmission, a case in which a sending data maintaining function, a retransmission function, and a notification function in the communication schedule unit 136 are used may be exemplified.

In addition, in the embodiment, although the abnormality determination unit 190, the timeout determination unit 191, the response checking unit 192, the protocol abnormality determination unit 193, the retransmission control unit 194, and the retransmission unit 195 are provided one by one, they may be provided in plural, respectively. At this time, it is necessary to clearly specify priority between the respective functional units. In addition, in a case in which the real-time communication unit 130, the non-real-time communication unit 131, and the retransmission unit 195 are provided in plural, a case in which identifiers are provided in the packets is exemplified.

Advantages

Advantages according to the above-described present invention will be described.

Even in a case in which the non-real-time data sending request or retransmission is generated at an arbitrary timing, the communication schedule unit 174 determines whether or not to permit the sending request by comparing the non-real-time data processing time or the retransmission data processing time with the remaining time until subsequent sending of the real-time data. In this manner, it is possible to accurately send the real-time data without being influenced by the sending and retransmission of the non-real-time data. In addition, it is possible to improve the communication band of the non-real-time data by effectively using the gap between the real-time data sending time and the sending time of retransmission data.

Furthermore, since it is possible to perform retransmission in a range in which the accuracy of the sending of the real-time data is maintained, it is possible to improve the data communicability from the communication control device 120 to the communication device 123, and thus it is possible to realize high reliability and high performance of the control system.

Furthermore, if setting is made such that priority of the retransmission is higher than priority of the sending of the non-real-time data, it is possible to perform retransmission without being influenced by the sending of the non-real-time data, and thus it is possible to enhance an advantage attributable to the retransmission.

What is claimed is:

1. A communication control device comprising:
   a real-time communication status extraction unit that acquires a communication timing of real-time data in which real-time properties are required;
   a dynamic fragment size determination unit that acquires a fragment size of sending data which can be sent until the communication timing acquired by the real-time communication status extraction unit;
   a fragment processing unit that fragments non-real-time data, in which the real-time properties are not required, to have at least a size which is equal to or less than the fragment size acquired by the dynamic fragment size determination unit; and
   a communication unit that sends the non-real-time data, which is fragmented by the fragment processing unit, before the communication timing of the real-time data;
   wherein the dynamic fragment size determination unit acquires the fragment size by dividing a time until a subsequent communication timing of the real-time data by a sending processing time for each unit data which is necessary for the sending of the non-real-time data; and wherein, in a case in which the acquired fragment size is equal to or less than a predetermined value, the dynamic fragment size determination unit provides a notification that fragmenting is impossible to the fragment processing unit.

2. The communication control device according to claim 1, further comprising:
a communication schedule unit that determines whether or not it is possible to send the non-real-time data, which is fragmented by the fragment processing unit, without interfering in a real-time data sending process,
wherein the communication unit sends the non-real-time data in a case in which sending of the non-real-time data is permitted according to determination performed by the communication schedule unit.

3. The communication control device according to claim 2,
wherein, in a case in which the processing time that is necessary for the sending of the non-real-time data which is requested to be sent is shorter than a time until the subsequent communication timing of the real-time data, the communication schedule unit permits the sending of the non-real-time data.

4. The communication control device according to claim 2,
wherein, in a case in which sending of the non-real-time data, which is requested to be sent, is not possible during which the real-time data is sent as many as a predetermined number of times or during a predetermined time, the communication schedule unit performs any one of processes of destroying the non-real-time data and providing a notification to the outside.

5. The communication control device according to claim 1,
wherein, in a case in which the non-real-time data includes a plurality of components, the fragment processing unit performs any one of processes of fragmenting data areas in the components, changing the sizes of the components, and changing the number of components which are included in the non-real-time data.

6. The communication control device according to claim 1,
wherein, in a case in which the real-time data is requested to be sent during a process of sending the non-real-time data, the communication schedule unit stops the sending of the non-real-time data and sends the real-time data.

7. The communication control device according to claim 1,
wherein the real-time communication status extraction unit reserves a time slot for a predetermined communication process, acquires a time until the reserved time slot, and provides a notification to the dynamic fragment size determination unit, and
wherein the dynamic fragment size determination unit acquires the fragment size based on the time until the time slot.

8. The communication control device according to claim 7,
wherein the communication control device is connected to another communication control device through a network, and
wherein the time slot is reserved for a communication process for transmitting a packet which is sent from the another communication control device.

9. The communication control device according to claim 8,
wherein the reserved time slot is determined based on communication delay of the packet which is sent from the another communication control device.

10. The communication control device according to claim 7,
wherein the communication control device forms a ring network together with a plurality of other communication control devices, and the plurality of other communication control devices respectively send redundant packets in the A-based rotation and B-based rotation of the ring network, and
wherein the time slot is reserved for the communication process of transmitting the redundant packets received from A-based rotation and for the communication process of transmitting the redundant packets received from B-based rotation, communication performed on earlier side between transmission of the redundant packets from the A-based rotation and transmission thereof from the B-based rotation is checked, and reservation of the time slot of the other side is canceled.

11. The communication control device according to claim 7,
wherein, in a case in which it is determined that the sending of the real-time data fails, the time slot is reserved for the communication process of a retransmission packet of the real-time data.

12. The communication control device according to claim 7,
wherein the time slot is reserved for the communication process of a retransmission packet of the real-time data, and the reservation of the time slot for the retransmission is canceled if success of the sending of the real-time data is checked.

13. A communication control device comprising:
a real-time communication status extraction unit that acquires a communication timing of real-time data in which real-time properties are required;
a dynamic fragment size determination unit that acquires a fragment size of sending data which can be sent until the communication timing acquired by the real-time communication status extraction unit;
a fragment processing unit that fragments non-real-time data, in which the real-time properties are not required, to have at least a size which is equal to or less than the fragment size acquired by the dynamic fragment size determination unit; and
a communication unit that sends the non-real-time data, which is fragmented by the fragment processing unit, before the communication timing of the real-time data;
wherein, in a case in which the acquired fragment size is equal to or less than a predetermined value, the dynamic fragment size determination unit provides a notification that fragmenting is impossible to the fragment processing unit.

14. A communication control device comprising:
a real-time communication status extraction unit that acquires a communication timing of real-time data in which real-time properties are required;
a dynamic fragment size determination unit that acquires a fragment size of sending data which can be sent until the communication timing acquired by the real-time communication status extraction unit;
a fragment processing unit that fragments non-real-time data, in which the real-time properties are not required, to have at least a size which is equal to or less than the fragment size acquired by the dynamic fragment size determination unit; and a communication unit that sends the non-real-time data, which is fragmented by the fragment processing unit, before the communication timing of the real-time data;

wherein, in a case in which the sending of the non-real-time data, which is requested to be sent, is not possible on a certain cycle, the fragment processing unit fragments the non-real-time data again according to the fragment size which can be sent until a communication timing of the real-time data on a subsequent cycle that is notified by the dynamic fragment size determination unit; and wherein, in a case in which the acquired fragment size is equal to or less than a predetermined value, the dynamic fragment size determination unit provides a notification that fragmenting is impossible to the fragment processing unit.

* * * * *